United States Patent
Gueziec et al.

(10) Patent No.: US 6,184,897 B1
(45) Date of Patent: Feb. 6, 2001

(54) COMPRESSED REPRESENTATION OF CHANGING MESHES AND METHOD TO DECOMPRESS

(75) Inventors: Andre Gueziec, Mamaroneck; Gabriel Taubin, Hartsdale, both of NY (US)

(73) Assignee: International Business Machines Corporation, Armonk, NY (US)

( * ) Notice: Under 35 U.S.C. 154(b), the term of this patent shall be extended for 0 days.

(21) Appl. No.: 09/006,771

(22) Filed: Jan. 14, 1998

Related U.S. Application Data

(60) Provisional application No. 60/035,014, filed on Jan. 15, 1997.

(51) Int. Cl.[7] .................................................. G06F 15/00
(52) U.S. Cl. ............................................................. 345/440
(58) Field of Search ................................... 345/440, 441, 345/423, 418, 121

(56) References Cited

U.S. PATENT DOCUMENTS 5,825,369 * 10/1998 Gueziec et al. ...................... 345/440
5,905,507 * 5/1999 Gueziec et al. ...................... 345/440

OTHER PUBLICATIONS

Gueziec, Andre, "Surface Simplification with Variable Tolerance", MRCAS '95, Nov. 4, 1995, 8 pages.
Taubin, Gabriel et al., "Geometric Compression Through Topological Surgery", RC20340 (#89924) Jan. 16, 1996 Computer Sciences, 22 pages.
Gueziec, Andre, et al., Cutting and Stitching; Efficient Conversion of a Non–Manifold Polygonal Surface to a Manifold, RC20935 (92693), Jul. 25, 1997, Computer Science/Mathematics, 32 pages.
Gueziec, Andre, "Surface Simplification Inside a Tolerance Volume", RC 20440(90191) May 20, 1997 Updated/Revised, Computer Science/Mathematics, 56 pages.

* cited by examiner

Primary Examiner—Phu K. Nguyen
(74) Attorney, Agent, or Firm—Jay P. Sbrollini; Perman & Green, LLP

(57) ABSTRACT

A computer implemented representation and a method for encoding and decoding sequences of changes of a manifold triangular mesh. The representation is composed of a base manifold triangular mesh and a succession of specialized mesh surgery operations that may be of a different type. The methods encode or decode any sequence of mark, move, cut, delete, close, fill, or add operations. The mark operation specifies a type of mark and a set of marked elements. The move operation determines a set of displaced vertices from a set of marked elements, and applies a set of vertex displacements to the set of displaced vertices. The cut operation cuts the changing mesh through a set of marked edges. The close operation is applied to one or more boundaries that are determined when the type of mark is a boundary type, and the one or more boundaries are determined by a marked elements variable. The fill operation adds the triangles of a simple polygon to a manifold triangular mesh by establishing a one to one correspondence between a contiguous subset of boundary edges of the manifold triangular mesh and the same number of contiguous edges of a loop defined by the boundary of the simple polygon. The add operation is preferably specified by an incremental manifold triangular mesh and a sequence of stitches, where the incremental manifold triangular mesh is a manifold triangular mesh, and where a stitch is a one to one correspondence between a contiguous subset of boundary edges of one boundary of the manifold triangular mesh and the same number of contiguous edges of boundary edges of one boundary of the incremental manifold triangular mesh.

41 Claims, 14 Drawing Sheets

COMPRESSED REPRESENTATION OF CHANGING MESHES AND METHOD TO DECOMPRESS

CROSS-REFERENCE TO RELATED APPLICATIONS

This patent application claims priority under 35 U.S.C §1.119 from i) Provisional Patent Application No. 60/035,014, filed Jan. 15, 1997, entitled "Compressed Delta Surfaces" by G. Taubin et. al., ii) U.S. patent application Ser. No. 08/840,001, filed on Apr. 24, 1997, entitled "Method to Convert Non-Manifold Polyhedral Surfaces into Manifold Surfaces" by A. Gueziec and G. Taubin, iii) U.S. patent application Ser. No. 08/688,572, filed Jul. 30, 1996, now U.S. Pat. No. 5,825,369 entitled "Compression of Simple Geometric Models Using Spanning Trees" by J. Rossignac and G. Taubin, and iv) U.S. patent application Ser. No. 08/685,422 filed Jul. 30, 1996, now U.S. Pat. No. 5,905,507 entitled "Compression of Geometric Models Using Spanning Trees" by J. Rossignac and G. Taubin, and is related to U.S. patent application (Attorney Docket No. Y0997-004), filed concurrently herewith, entitled "Method for Generating and Applying Changes in the Level of Detail of a Polygonal Surface", by G. Taubin et al., all of which are herein incorporated by reference in their entirety.

FIELD OF THE INVENTION

This invention relates to the field of computer graphics and, in particular, to methods for representing, encoding and decoding sequences of changes in three dimensional (3D) geometric models.

BACKGROUND OF THE INVENTION

Although modeling systems used in Mechanical Computer Aided Design and in animation are expanding their geometric domain to include free form surfaces, polygonal models remain the primary 3D representation used in the manufacturing, architectural, Geographic Information Systems, geoscience, and entertainment industries. Polygonal models are particularly effective for hardware assisted rendering, which is important for video-games, virtual reality, fly-through, and electronic mock-up applications involving complex Computer Aided Design (CAD) models.

Since methods are known in the prior art for easily and efficiently triangulating arbitrary polygonal faces, it is sufficient to consider geometric models which are defined by triangular meshes. For example, a method to triangulate the faces of a polygonal model is described by Ronfard, R. and Rossignac, J. in "Triangulating multiply-connected polygons: A simple, yet efficient algorithm", Computer Graphics Forum, V. 13, No. 3, 1994, pp. 281–292.

A "triangular mesh" is defined by the position of its vertices ("geometry"), which are N-dimensional vectors, by the association between each triangle and its sustaining vertices ("connectivity"), and by colors, normals, and texture coordinates ("properties"), which do not affect the geometry, but influence the way it is shaded.

A triangular mesh with V vertices and T triangles is typically represented in the prior art (for example, as described by Foley et.al. in "Computer Graphics: Principles and Practice", Addison-Wesley, 1990) by a "vertex positions array", a "triangle array", and (optionally) one or more "property arrays". The position of each vertex of the triangular mesh is represented in the vertex positions array by N floating point coordinates. Each triangle of the triangular mesh is represented in the triangle array by three indices to the vertex positions array.

A triangular mesh may also have continuous or discrete properties, such as colors, normals, and texture coordinates, associated with its vertices or triangles. To model various discontinuous phenomena on the triangular mesh, properties can also be associated with each vertex of each triangle. These (triangle,vertex) pairs are called "corners", and the corresponding properties "corner" properties. These corner properties are represented in the optional property arrays.

Triangular meshes are typically classified (for example, as described by Hoffmann, C., "Geometric and Solid Modeling", Morgan Kaufmann, 1989) as manifolds and non-manifolds. An "edge" of a triangular mesh is a pair of vertices in a triangle, without taking into account the order of the two vertices within the edge. The two vertices of an edge are called endpoints of the edge. The triangle is said to be incident to the edge, and the edge incident to the vertices. Two triangles sharing an edge are said to be adjacent. Two edges sharing a vertex are said to be adjacent. The set of triangles that share a vertex are referred to as the star of the vertex. The number of triangles in the star of a vertex is referred to herein as the valence of the vertex. The link of a vertex is obtained by connecting all adjacent edges bounding the star of the vertex and discarding from the list of edges so formed the edges incident to the vertex. If the link has one component, and is not intersecting itself, the vertex is said to be a regular vertex, otherwise it is referred to as a singular vertex. For a regular vertex, if the link is closed, meaning that the first end point of the first edge of the link is the same as the last end point of the last edge, the vertex is an interior regular vertex, otherwise it is a boundary vertex.

The edges of a triangular mesh define a partition of the vertices of the triangular mesh into one or more disjoint subsets of vertices such that the two endpoints of each edge of the triangular mesh belong to the same subset. This partition of the vertices of the triangular mesh defines an associated partition of the triangles of the triangular mesh into one or more disjoint subsets of triangles, which are in one to one correspondence with the subsets of vertices. The subset of triangles associated with a subset of vertices is composed of all the triangles of the triangular mesh with vertices in the subset of vertices. If the triangular mesh has properties, the partition of the vertices also defines corresponding partitions of the properties in a similar manner. Each subset of vertices, the corresponding subset of triangles, and (optionally) the corresponding subsets of properties define a new triangular mesh which is called a "connected component" of the triangular mesh.

A triangular mesh is referred to as a "manifold triangular mesh" if the following two conditions are satisfied: 1) if any two triangles of the triangular mesh intersect, the intersection is either a common vertex or a common edge; and 2) all the vertices of the triangular mesh are regular vertices, which implies that each edge of the triangular mesh is shared by at most two triangles.

An edge of a manifold triangular mesh may have either one or two incident triangles. An "interior edge" is an edge with two incident triangles. A "boundary edge" is an edge with one incident triangle. It is known in the prior art that the endpoints of the boundary edges of a manifold triangular mesh are boundary vertices, and that the boundary vertices of a manifold triangular mesh are endpoints of the boundary edges. The boundary edges of a manifold triangular mesh can be partitioned into one or more disjoint subsets of boundary edges referred to as "boundaries", such that two boundary edges which share a boundary vertex as a common endpoint belong to the same boundary. It is also known in the prior art that each boundary vertex of a manifold triangular mesh is the endpoint of exactly two boundary edges.

Since methods are known in the prior art for converting non-manifold polygonal models into manifold polygonal models, it is sufficient to consider triangular meshes which are manifolds. A method to convert non-manifold polygonal models into manifold polygonal models is described in "Method to Convert Non-Manifold Polyhedral Surfaces into Manifold Surfaces", U.S. patent application Ser. No. 08/840,001, filed on Apr. 24, 1997, by A. Gueziec and G. Taubin, herein incorporated by reference in its entirety.

A manifold triangular mesh can be changed or edited to produce a new manifold triangular mesh, by modifying either its geometry, its connectivity, or both its geometry and its connectivity. Optionally, the change may also involve a modification of the properties of the manifold triangular mesh.

It is known in the prior art (described by Massey, W. S., in "Algebraic Topology: An Introduction", Hartcourt, Brace & World, Inc., New York, 1967) that the following types of changes on a manifold triangular mesh, referred to herein as "mesh surgery operations", produce a new manifold triangular mesh:

1) cut the manifold through a subset of its edges; 2) identify, or stitch, adjacent pairs of boundaries edges; 3) delete one or more connected components; 4) add one or more connected components; and 5) move vertices and (optionally) properties.

Of most interest to the teaching of this invention is to represent sequences of mesh surgery operations applied to an initial manifold triangular mesh in compressed form for efficient storage and transmission, and efficient decompression methods. For the purposes of this disclosure a manifold triangular mesh followed by a sequence of mesh surgery operations is referred to as "changing mesh".

One significant advantage of applying mesh surgery operations to manifolds is that the boundaries are closed 1-D manifolds. This property results in a simplified description and encoding of some operations, such as adding a surface and other stitching operations, which only affect the surface boundaries.

Applications of changing meshes include, but are not limited to, a progressive transmission of multi-resolution models, and visualization of scientific data represented by time-dependent triangular meshes.

A multi-resolution polygonal model is a sequence of polygonal models, where each element of the sequence, referred to as a "level of detail", or simply as a "level", has more vertices and faces than the previous level. The first element of the sequence is referred to as the "lowest resolution level", and the last element of the sequence is referred to as the "highest resolution level".

When transmitting a multi-resolution polygonal model over a communications link or network, it is desirable to send the information necessary to reconstruct the levels in increasing order of level of detail, i.e., from low to high resolution, such that the receiver may render a level as soon as it has all of the information associated with the level. In this manner the user can interact with a rendered level before the system has all of the information necessary to render the next level. This can be referred to as a progressive representation and transmission.

Independent of transmission through computer networks, and to speed-up the visualization of large surface data sets, one may wish to progressively display a surface such that while the computer system used for displaying the data sets is busy preparing high resolution images, lower resolution images are quickly available for display and interaction using simplified models. For this type of application lower resolution levels of detail should be displayed first, and changes from one level to the next should be provided to the computer system.

In both Scientific Visualization applications and computer animations the connectivity of triangular meshes often changes over time. A good example of one such application is a weather simulation that is used for observing the evolution of a cloud formation over time. Clouds may be represented as iso-surfaces computed in regularly sampled three dimensional volume data. This particular application is described in "Three Dimensional Visualization for Support of Operational Forecasting at the 1996 Centennial Olympic Games" by L. A. Treinish and L. P. Rothfusz, which appeared in the 13th Conference on IIPS for Meteorology, Oceanography and Hydrology, in February 1997, Long Beach, Calif.

Prior art methods for representing surface changes include the following techniques, described by Hoppe's "Progressive Meshes", Proceedings of ACM SIGGRAPH'93, pp.99–108, by Welch and Witkin's "Free-Form Shape Design Using Triangulated Surfaces", Proceedings of ACM SIGGRAPH'97, by Popovic et al. "Progressive Simplicial Complexes", Proceedings of ACM SIGGRAPH'97, pp. 217–224 and by Puppo "Simplification, LOD and Multi-resolution—Principles and Applications", Eurographics'97 Tutorial Notes.

The technique of Hoppe builds a progressive mesh representation that consists of a description of the transition from a simplified mesh to the original mesh. Hoppe sends a succession of "vertex splits" in order to undo the edge collapses that he performed earlier. For each of these edge splits, he must specify the indices in the original mesh of the simplified vertex resulting from the collapse, as well as the indices of the neighboring vertices where the new triangles will be inserted. In addition, the displacement of the new vertex with respect to the previous position of the vertex must be specified.

One problem with Hoppe's Progressive Meshes technique is that each vertex split information contains a vertex identification (ID), the position of two vertices after splitting, and the relative position of two vertices in the neighborhood of the first vertex. This results in a requirement to transmit a considerable amount of information. Another drawback is that each individual vertex split must be specified. Hoppe's Progressive Meshes technique only permits one to represent and encode changes in the level of detail, not in the surface topology.

Welch and Witkin describe a system for interactive editing of triangular meshes where mesh surgery operations are allowed. However, in their description Welch and Witkin are not concerned with the compressed representation of the resulting sequences of editing operations.

The Progressive Simplicial Complexes technique of Popovic and Hoppe is a generalization of the Progressive Meshes technique to lines, surfaces and volumes. A vertex split is replaced with a "generalized vertex split". With respect to the vertex split, additional information is necessary to encode whether the added vertex will add a point, a line segment, a triangle, or a tetrahedron to the complex. Popovic's method allows one to change the topology, but the result of his technique is not necessarily a surface, and if it is a surface, it is not necessarily a manifold surface.

The Multi-Triangulation technique of Puppo et al. is essentially a method for representing several levels of detail of a surface simultaneously, using a directed acyclic graph whose nodes represent increases and decreases of the number of triangles and whose arcs represent the dependencies between such increases or decreases. Puppo et al. do not discuss how the levels of detail can be transmitted efficiently. Furthermore, it is not possible to change the surface topology using Puppo et al.'s method.

One method to compress manifold triangular meshes is described by Michael Deering in "Geometric compression", Proceedings of ACM Siggraph'95, pp 13–20, August 1995; and in European Patent Applications "Method and apparatus for geometric compression of three-dimensional graphics", EP 0 757 332 A2, filed May 8, 1996, by Michael Deering. In this method a stack-buffer is used to store 16 of the previously used vertices instead of having random access to all the vertices of the model. The triangles of the mesh are partitioned into "generalized triangle meshes". Triangles which belong to the same generalized triangle mesh may share vertices, which are transmitted only once using the stack-buffer. But vertices common to triangles which belong to different generalized triangle meshes must be duplicated. In this method the connectivity of the triangular mesh is lost. The vertex positions and properties are quantized and entropy encoded.

Another method to compress manifold triangular meshes is described in "Compression of Simple Geometric Models Using Spanning Trees", U.S. patent application Ser. No. 08/688,572 filed Jul. 30, 1996, by J. Rossignac and G. Taubin, and in "Compression of Geometric Models Using Spanning Trees", U.S. patent application Ser. No. 08/685,422 filed Jul. 30, 1996, by J. Rossignac and G. Taubin, which are incorporated by reference herein in their entireties. In these methods the connectivity of the triangular mesh is preserved without loss of information. In this scheme the vertices of the triangular mesh are organized into a "vertex spanning tree", and the triangles into a "triangle spanning tree". The vertex spanning tree is a sub-graph of the "graph of the polygonal model". The graph of a polygonal model is the graph defined by the vertices and edges of the polygonal model. And the triangle spanning tree is a sub-graph of the dual graph of the triangular mesh. The "dual graph of the triangle mesh" is the graph defined by the faces and edges of the triangle mesh. The order of traversal of both trees define an order for the edges of triangular mesh. The vertex positions and properties are quantized and entropy encoded. The prior art concerning graphs and trees is described by R. E. Tarjan in "Data Structures and Network Algorithms", SIAM, 1983.

However, neither Deering's nor Rossignac and Taubin's methods address the compressed representation of changing meshes. Although Hoppe's and Popovic's methods address a limited class of changing meshes, they are not efficient compression schemes. They require in the order of N.log(N) total bits of data to represent a triangular mesh of N vertices in progressive form. On the other hand, Rossignac and Taubin method require in the order of N total bits of data to represent a single resolution mesh in compressed form.

In summary, of the prior art techniques known to the inventors the triangle mesh compression schemes do not adequately address the compression of changing meshes, while some are restricted to particular cases of changing meshes but are not efficient compression schemes, and while others do not solve the problem of representing changing meshes in compressed form. There is thus a long felt need to overcome these and other problems of the prior art and to provide an efficient method for encoding changing meshes.

OBJECTS AND ADVANTAGES OF THE INVENTION

It is a first object and advantage of this invention to provide an efficient method for the compression of changing meshes.

It is another object and advantage of this invention to define a data structure for representing a manifold triangular mesh comprising a base mesh and a sequence of at least two operations of a different type.

It is another object and advantage of this invention to define a set of operations for representing a changing manifold triangular mesh.

It is another object and advantage of this invention to provide methods for efficiently encoding the set of operations for representing a changing manifold triangular mesh.

It is another object and advantage of this invention to provide methods for efficiently decoding the foregoing encodings and for reconstructing a manifold triangular mesh from the specification of a base mesh and a set of operations applied in sequence.

It is a further object and advantage of this invention to provide a simplification technique that requires a system to transmit considerably less data that conventional techniques, such as the above-described Hoppe's Progressive Meshes technique, wherein surface updates can be specified as individual vertex splits, or batches of vertex splits, or more general operations.

SUMMARY OF THE INVENTION

The foregoing and other problems are overcome and the objects and advantages are realized by methods and apparatus in accordance with embodiments of this invention.

Disclosed is a computer implemented representation and method for encoding and decoding sequences of changes of a manifold triangular mesh. The representation is composed of a base manifold triangular mesh and a succession of specialized mesh surgery operations that may be of a different type. The computer implemented methods for encoding or decoding a changing mesh encode or decode any sequence of a mark operation, a move operation, a cut operation, a delete operation, a close operation, a fill operation, or an add operation. The mark operation specifies a type of mark and a set of marked elements. The move operation determines a set of displaced vertices from a set of marked elements, and applies a set of vertex displacements to the set of displaced vertices. The cut operation cuts the changing mesh through a set of marked edges. The close operation is applied to one or more boundaries that are determined when the type of mark is a boundary type, and the one or more boundaries are determined by a marked elements variable. The fill operation adds the triangles of a simple polygon to a manifold triangular mesh by establishing a one to one correspondence between a contiguous subset of boundary edges of the manifold triangular mesh and the same number of contiguous edges of a loop defined by the boundary of the simple polygon. The add operation is preferably specified by an incremental manifold triangular mesh and a sequence of stitches, where the incremental manifold triangular mesh is a manifold triangular mesh, and where a stitch is a one to one correspondence between a contiguous subset of boundary edges of one boundary of the manifold triangular mesh and the same number of contiguous edges of boundary edges of one boundary of the incremental manifold triangular mesh.

Disclosed herein is a method for encoding a representation of a three dimensional scene. The method includes steps of (a) generating surface data representing polygonal surfaces, the polygonal surfaces including a plurality of elements; (b) generating first data representing a first operation with respect to elements of the polygonal surfaces; and (c) generating second data representing a second operation with respect to elements of the polygonal surfaces. The second operation is different from said first operation, and the first and second operations are performed in a predetermined sequence with respect to elements of the polygonal surfaces to generate a representation of a three dimensional scene. The first and second operations are one of the above described mark operation, move operation, cut operation, delete operation, close operation, and fill operation.

The method further includes a step of grouping the surface data, the first data and the second data to form at least one message. The at least one message is communicated to a target node whereby the first and second operations are performed in a predetermined sequence with respect to elements of the polygonal surfaces to generate a representation of a three dimensional scene.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
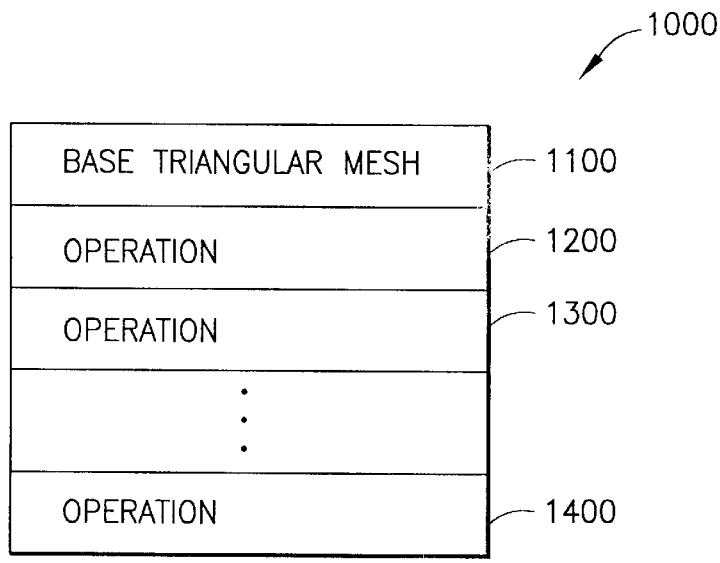
FIG. 1 is a block diagram of a data structure representing a changing mesh.

As employed herein "elements of a manifold triangular mesh" are considered to be vertices, triangles, edges, boundaries, boundary vertices, and connected components. Vertices and triangles can be identified by their respective positions in the vertex positions array and triangle array. Each vertex of the manifold triangular mesh has a corresponding "vertex index" that is preferably defined as the position of the vertex in the vertex positions array. Each triangle of the manifold triangular mesh has a corresponding "triangle index" that is preferably defined as the position of the triangle in the triangle array.

From the vertex indices and the triangle indices, the following implicit information is preferably determined.

The first implicit information is an "edge array" that lists pairs of edge endpoints. Preferably, the edges appear sorted lexicographically in the edge array, with smaller indices coming first. This provides a convention for enumerating the edges. Each edge of the manifold triangular mesh has a corresponding "edge index" that is preferably defined as the position of the edge in the edge array. However, it should be realized that the use of this convention is not a limitation upon the practice of this invention as other conventions for enumerating the edges can be adopted as desired.

The second implicit information is a "boundary array" that is composed of zero or more "boundary loops". Each boundary loop is composed of a "number of boundary vertices" and three or more "boundary loop vertex indices". Each boundary loop corresponds to one boundary of the manifold triangular mesh, and each boundary loop vertex index corresponds to an index of a boundary vertex of the boundary of the manifold triangular mesh. Preferably, of the three or more boundary loop vertex indices, the first is the smallest, and the second is the smallest one of the two indices of boundary vertices adjacent to the first boundary loop vertex index. All of the boundary loop vertex indices appear in an order such that every consecutive pair of vertices modulo circular permutation are the endpoints of a boundary edge. Preferably, in the boundary array, boundary loops appear in the order of increasing first vertex index. Each boundary of the manifold triangular mesh has a corresponding "boundary index" preferably defined as the position of the boundary in the boundary array. However, the use of this convention is not a limitation upon the practice of the invention, and other conventions for enumerating boundary loops and boundary loop vertex indices may be adopted if desired.

The third implicit information is an "enumeration of the connected components". Preferably, the order of the connected components is determined by the lowest vertex index of a vertex belonging to the connected component, sorted in increasing order. Each connected component of the manifold triangular mesh has a corresponding "connected component index" that is preferably defined as the number assigned to the connected component in the enumeration of the connected components. However, the use of this convention is not a limitation upon the practice of this invention, and other conventions for enumerating connected components can be adopted if desired.

When an operation results in an increase in the number of vertices, new vertex indices are assigned to the new vertices. The vertex index of the vertex immediately succeeding the last vertex of the current manifold triangular mesh is assigned to the first new vertex index, and consecutive vertex indices are assigned to each subsequent new vertex.

When an operation results in a decrease in the number of vertices, the first remaining vertex is assigned the vertex index 1, and the subsequent remaining vertices are assigned consecutive vertex indices.

When an operation results in a change in the number of vertices, the vertex indices in the triangle array are updated with the new assigned indices.

When an operation results in an increase in the number of triangles, new triangle indices are assigned to the new triangles. The triangle indices immediately succeeding the last triangle of the current manifold triangular mesh is assigned to the first new triangle, and consecutive triangle indices are assigned to each subsequent new triangle.

When an operation results in a decrease in the number of triangles, the first remaining triangle is assigned the triangle index 1, and the subsequent remaining triangles are assigned consecutive triangle indices.

When an operation results in a change in either the number of vertices, or the number of triangles, the edges, boundaries, and connected components are recomputed and re-enumerated as described above, as functions of the vertices and triangles.

For the purposes of this description, it is more efficient to break the mesh surgery operations into the following collection of "specialized mesh surgery operations". This is true mainly because when applying a succession of mesh surgery operations, it is frequently the case that such operations are not independent of each other. For example, if a connected component is added and then stitched to an existing connected component, some vertex coordinates are redundantly specified (those of the boundary of the existing connected component to which the new connected component is stitched), and it is more efficient to define a specialized add operation that specifies only those vertex coordinates that are necessary.

The collection of specialized mesh surgery operations are any of a "mark operation", a "move operation", a "cut operation", a "delete operation", a "close operation", a "fill operation", or an "add operation".

The mark operation specifies a set of elements of a manifold triangular mesh to be operated on by other subsequently applied specialized mesh surgery operations. The mark operation is specified by a "type of marked element", and a "set of marked elements". The value of the type of marked element may be any of a "none type", a "vertex type", a "triangle type", an "edge type", a "boundary type", or a "connected component type". The none type implies that no element of the manifold triangle mesh is marked. Any existing previous marks are discarded before the mark operation is performed, resulting in saving the type of marked element and the set of marked elements for later use by subsequent specialized mesh surgery operations. Some of the other specialized mesh surgery operations may also produce an implicit mark operation.

Figure 5A:
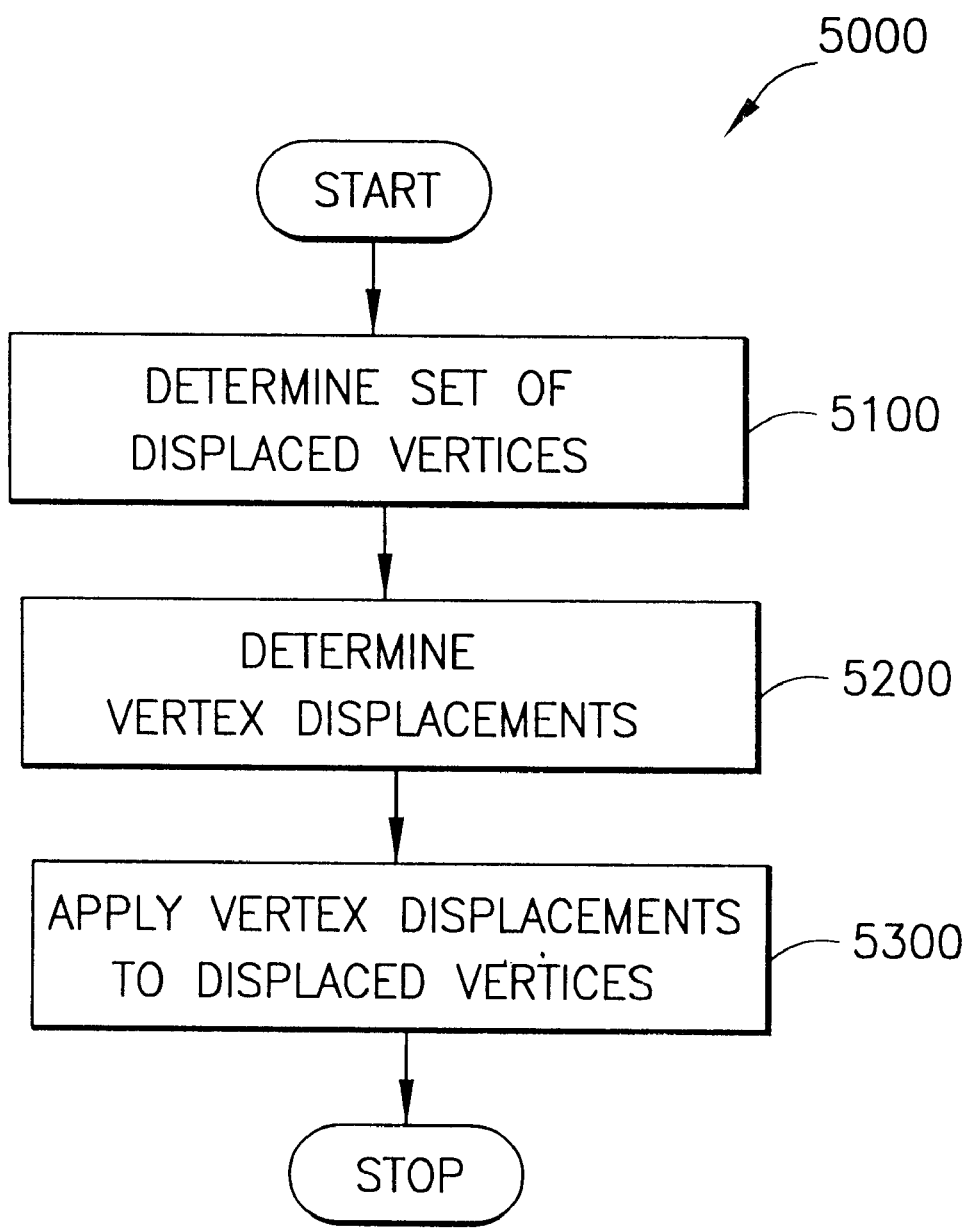
FIG. 5A is a flow chart of a method for applying a move operation to a current manifold triangular mesh in step 2400 of the method of FIG. 2.
Figure 5B:
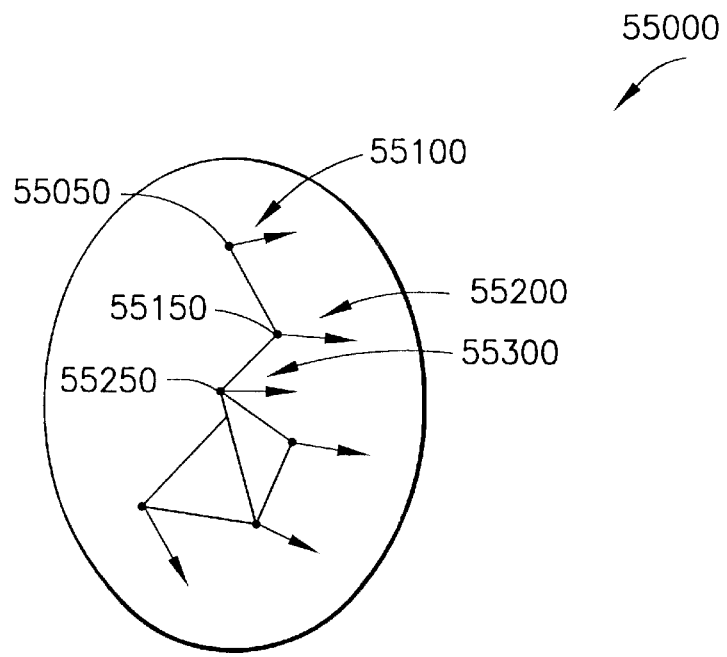
FIG. 5B is a diagram illustrating a move operation.

As is illustrated in FIG. 5B, the move operation displaces a "set of displaced vertices" composed of one or more "displaced vertices" 55050, 55150, 55250. The set of displaced vertices is determined by elements that have been marked by a previous operation. If the type of marked elements is the none type, the set of displaced vertices is empty, and the move operation does not produce any effect. If the type of marked elements is vertex type, the set of displaced vertices is composed of the vertices determined by the set of marked elements. Otherwise, the set of displaced vertices is composed of all the vertices belonging to the marked elements (triangles, edges, boundaries, or connected components). The type of marked element and the set of marked elements remain unchanged after the move operation is applied. A "vertex displacement" 55100, 55200, 55300 is applied to each displaced vertex 55050, 55150, 55250.

Figure 6A:
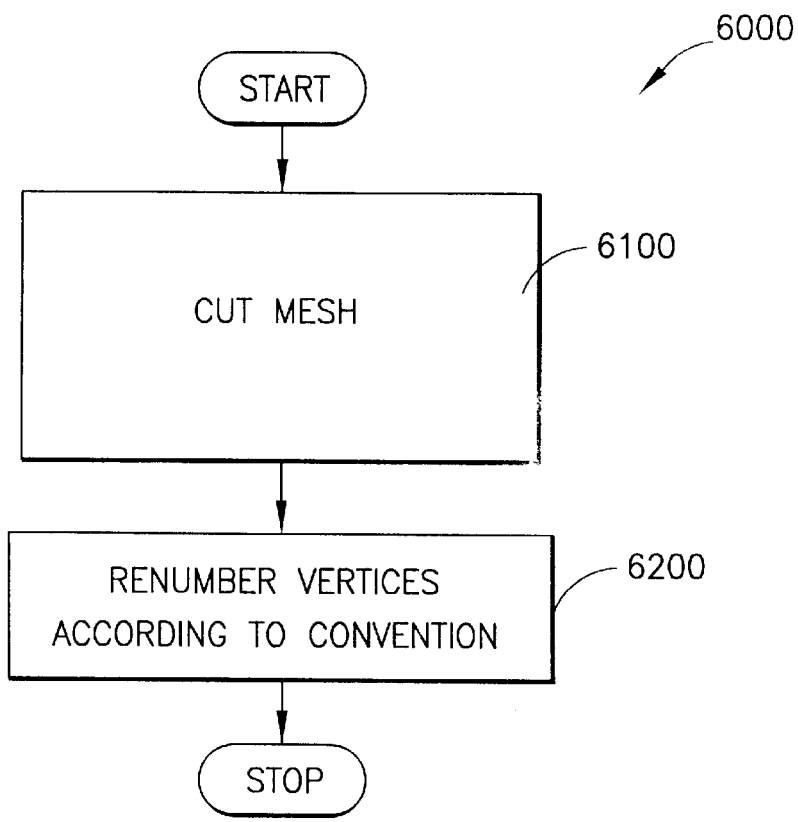
FIG. 6A is a flow chart of a method for applying a cut operation.
Figure 6B:
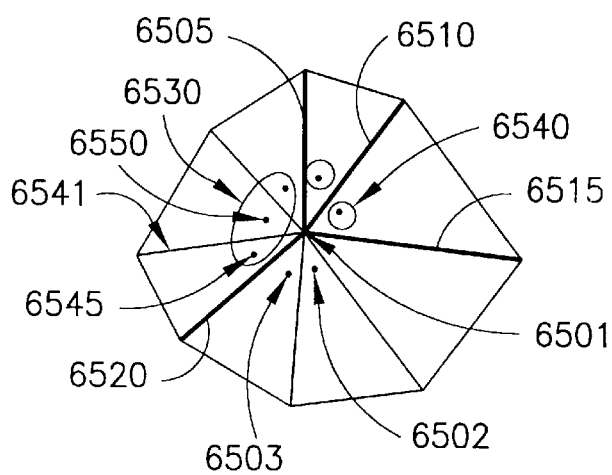
FIG. 6B is a diagram illustrating a cut operation.

As is illustrated in FIG. 6B, the cut operation cuts the manifold triangular mesh through edges that have been marked by a previous operation. The cut operation may change the connectivity of the manifold triangular mesh in the vicinity of the marked edges. The marked edges 6505, 6510, 6515, and 6520 define a partition of the corners 6502, 6503 of the star of each vertex 6501 of the manifold triangular mesh into one or more "cut connected components" 6530, 6540, with each cut connected component corresponding to one vertex of the manifold triangular mesh resulting from the cut operation. Two corners 6545, 6550 belong to the same cut connected component 6530 if they are both endpoints of a common unmarked edge 6541 of the manifold triangular mesh. When the cut operation results in the duplication of vertices, the vertex coordinates of duplicated vertices remain unchanged. The cut operation produces an implicit mark operation, where the type of marked element is vertex type, and the set of marked elements is the set of boundary vertices of the new boundaries created by the cut operation.

The delete operation removes zero or more triangles and vertices from the manifold triangular mesh. The triangles to be removed are determined by the set of marked elements previously specified by a mark operation. The vertices that are referenced only by these triangles are also removed from the manifold triangular mesh. If the marked elements are vertices, the triangles to be removed are all the triangles incident to one or more marked vertex. If the marked elements are triangles, the marked triangles are the triangles to be removed. If the marked elements are edges, the delete operation operates on the set of endpoints of such edges as if they were marked vertices. If the marked elements are boundaries, the delete operation operates on the set of boundary vertices of such boundaries as if they were marked vertices. If the marked elements are connected components, all the triangles of the marked connected components are removed. To prevent the creation of a non-manifold triangular mesh, and before the triangles are actually removed from the manifold triangular mesh, a set of "boundary of removed region" edges, and a cut operation is applied to the manifold triangular mesh as if the boundary of removed region edges were marked. The boundary of removed region edges are determined as those edges that have exactly one incident triangle to be removed and one incident triangle not to be removed. The delete operation sets the type of mark to none mark.

A rooted tree with N edges (and N+1 nodes) determines a "loop" of 2N edges (and 2N nodes), represented as a "loop table" of indices of tree nodes. The loop is constructed during the recursive traversal of the rooted tree. References to rooted tree nodes encountered going down the rooted tree are added to the loop table during the traversal. Except for leaf nodes, these references are also pushed onto a "loop stack". When a leaf node is visited, references are popped from the loop stack and added to the loop table until the reference to the tree node where the next run starts is popped, or until the loop stack is exhausted.

The close operation identifies one or more pairs of edges of the same boundary of a manifold triangular mesh by establishing a one to one correspondence between a contiguous subset of boundary edges and the same number of contiguous bounding loop edges, the bounding loop defined by a rooted tree. The close operation sets the type of mark to none mark.

A "simple polygon" is conventionally defined as a polygon that is triangulated without creating interior vertices. Thus, a simple polygon is a manifold triangular mesh with exactly one boundary. As in the case of the rooted tree, the boundary of a simple polygon also defines a loop.

The fill operation adds the triangles of a simple polygon to a manifold triangular mesh by establishing a one to one correspondence between a contiguous subset of boundary edges of the manifold triangular mesh and the same number of contiguous edges of the loop defined by the boundary of the simple polygon. The correspondence is such that each vertex of the simple polygon is put in correspondence with one vertex of the original manifold triangular mesh.

The add operation is used both to add detail to a manifold triangular mesh, without changing its connectivity, and to change the connectivity. The add operation is specified by an "incremental manifold triangular mesh" and a sequence of "stitches", the incremental manifold triangular mesh being a manifold triangular mesh. A stitch is a one to one correspondence between a contiguous subset of boundary edges of one boundary of the manifold triangular mesh and the same number of contiguous edges of boundary edges of one boundary of the incremental manifold triangular mesh. The manifold triangular mesh resulting from an add operation may have more vertices than the original manifold triangular mesh.

FIG. 1 is a block diagram of a data structure 1000 representing a "changing mesh". It is composed of a "base triangular mesh record" 1100, and one or more "operation records" 1200, 1300, 1400. The base triangular mesh record contains information to reconstruct the geometry, connectivity, and (optionally) properties of a "base manifold triangular mesh". The operation records 1200, 1300, 1400 describe a "sequence of operations" composed of one "first operation" and one or more additional "operations". Each of the first operation and additional operations produce a "resulting manifold triangular mesh". The first operation contains information describing a specialized mesh surgery operation to be applied to the base manifold triangular mesh. Each additional operation contains information describing a mesh surgery operation to be applied to the resulting manifold triangular mesh of the previous operation. Each of the first operation and additional operations are one of a "mark operation", a "move operation", a "cut operation", a "delete operation", a "close operation", a "fill operation", and an "add operation".

In a preferred embodiment the base triangular mesh record 1100 is composed of a "vertex positions array", a "triangle array", and (optionally) one or more "property arrays". In another preferred embodiment the base triangular mesh record 1100 is compressed.

In one embodiment the base manifold triangular mesh is represented in compressed form in the base triangular mesh record 1100 using the method described in commonly assigned U.S. patent application entitled "Compression of Simple Geometric Models Using Spanning Trees", Ser. No. 08/688,572, filed Jul. 30, 1996, by J. Rossignac and G. Taubin. In another embodiment the base manifold triangular mesh is represented in compressed form in the base triangular mesh record 1100 using the method described in commonly assigned U.S. patent application entitled "Compression of Geometric Models Using Spanning Trees", Ser. No. 08/685,422, filed Jul. 30, 1996, by J. Rossignac and G. Taubin. However, other compression techniques can be employed.

Figure 2:
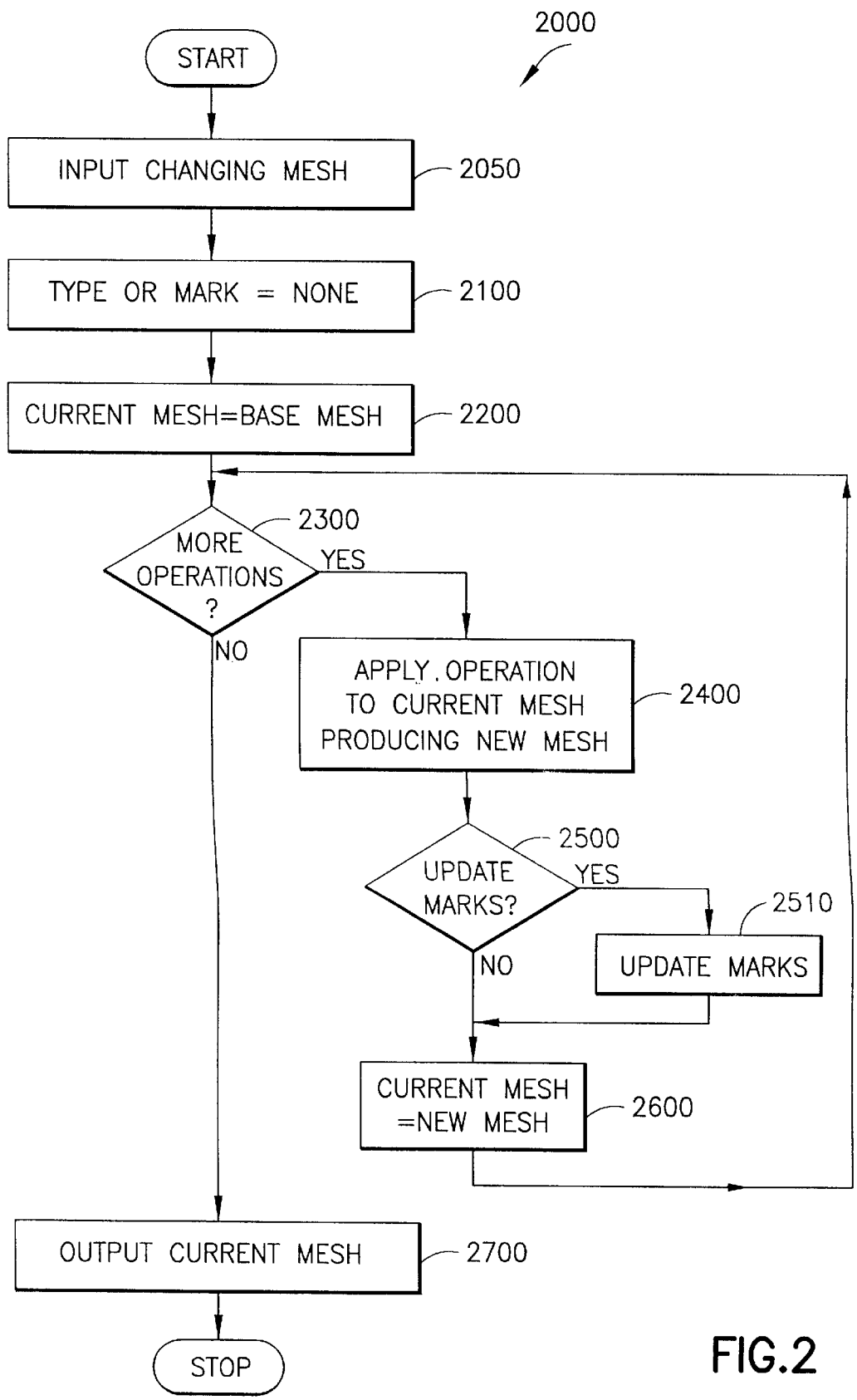
FIG. 2 is a flow chart of a method for decompressing a changing mesh.

FIG. 2 is a flow chart of a method 2000 for decompressing a changing mesh. In a preferred embodiment the method maintains a "type of marked elements" variable, a "set of marked elements", and a "current manifold triangular mesh". In step 2050 a changing mesh is inputted and stored in the data structure 1000 of FIG. 1. In step 2100 the type of marked elements variable is initialized to the none type value. In step 2200 the current manifold triangular mesh variable is initialized as the base manifold triangular mesh of the changing mesh from the data stored in record 1100 of data structure 1000. In steps 2300, 2400, 2500, 2510, and 2600, the operations described in the operation records 1200, 1300, 1400 of data structure 1000 are applied in the order they appear in the sequence of operations. In step 2400 a new manifold triangular mesh is constructed by applying one operation to the current manifold triangular mesh. In step 2500 it is determined whether the type of marked elements and the set of marked elements need to be updated, after the operation is performed. If the type of marked elements and the set of marked elements need to be updated, they are updated in step 2510. In step 2600 the current manifold triangular mesh is updated as the new manifold triangular mesh produced in step 2400. In step 2300 the method determines whether all the operations have been performed. If all the operations have been performed, the method proceeds to step 2700. Otherwise, the loop defined by steps 2400, 2500, 2510, 2600 and 2300 is repeated. In step 2700 the method outputs the current manifold triangular mesh as the result, and stops.

Figure 3:
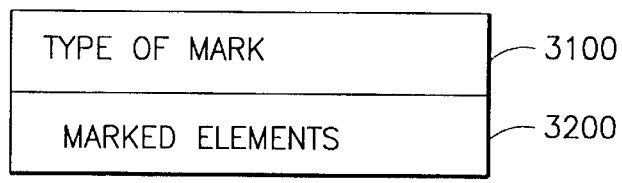
FIG. 3 is a block diagram of a data structure representing a mark operation.

FIG. 3 is a block diagram of the data structure 3000 representing a "mark operation". It is composed of a "type of mark" field 3100 and a "marked elements field" 3200. The type of mark field value is one of a "none type", a "vertex type", "triangle type", "edge type", "connected component type", or "boundary type". In a preferred embodiment the marked elements field 3200 is composed of one or more "mark bits", each bit corresponding to one element of the manifold triangular mesh, wherein the value of each mark bit determines whether the corresponding element is marked or is not marked. The marked elements field 3200 thus contains information to determine which elements are marked.

In a preferred embodiment the marked elements field 3200 is composed of a "sequence of mark bits" that includes one or more "mark bits". Each mark bit is associated with one element of the manifold triangular mesh of the type specified by the value of the type of mark field 3100. It is preferred that the sequence of mark bits is compressed, such as by run-length encoding or by an entropy encoding.

In a preferred embodiment the marked elements field 3200 is composed of one or more "marked element indices", with each marked element index being associated with one marked element. In another embodiment the marked elements field is composed of one or more "unmarked element indices", with each unmarked element index being associated with one unmarked element. In this case the marked elements are those not associated with unmarked element indices.

Figure 4:
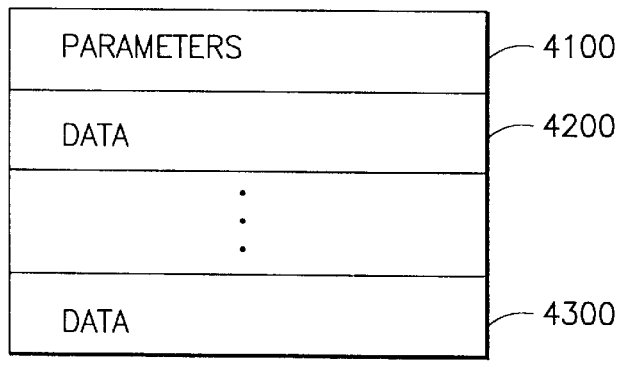
FIG. 4 is a block diagram of a data structure representing a move operation.

FIG. 4 is a block diagram of a data structure 4000 representing a "move operation". The data structure 4000 is composed of one "parameters" field 4100 (optional), and one or more "data" fields 4200, 4300. Each data field 4200, 4300 is associated with one marked vertex.

FIG. 5 is a flow chart of a method 5000 for applying the move operation to the current manifold triangular mesh in step 2400 of the method shown in FIG. 2. In step 5100 the set of displaced vertices is determined from the values of the type of mark 3100 and the set of marked elements 3200 variables. If the type of marked elements 3100 is none type, the set of displaced vertices is empty, and the move operation does not produce any effect. If the type of marked elements 3100 is vertex type, the set of displaced vertices is composed of the vertices determined by the set of marked elements 3200. Otherwise, the set of displaced vertices is composed of all the vertices belonging to the marked elements (triangles, edges, boundaries, or connected components). In step 5200 the vertex displacements corresponding to the vertices in the set of displaced vertices is determined from the data contained in data structure 4000 of FIG. 4. In step 5300 the vertex displacements determined in step 5200 are applied to the current manifold triangular mesh producing the new manifold triangular mesh. Since the type of marked element 3100 and the set of marked elements 3200 remain unchanged after the move operation is applied, step 2510 is not performed in the method of FIG. 2 for a move operation.

In a preferred embodiment each vertex displacement (e.g., 55100 of FIG. 5B) is decomposed as a sum of a "global vertex displacement" and a "relative vertex displacement". The global vertex displacement is encoded in the parameters field 4100 of the data structure 4000. The relative vertex displacement may possibly have different values for different displaced vertices and is encoded in the data fields 4200, 4300 of the data structure 4000.

In one embodiment the global vertex displacement has the same value for all the displaced vertices, while in another embodiment the global vertex displacement has possibly different values for different displaced vertices, and is computed as a "predictor function" of one or more "global displacement parameters". In this case the global displacement parameters are encoded in the parameters field 4100 of the data structure 4000.

It is also within the scope of the teaching of this invention that the predictor function is not only a function of the global displacement parameters, but also of one or more neighboring vertices of the vertex. A neighboring vertex is the other endpoint of an edge which has the vertex as one endpoint.

Figure 5C:
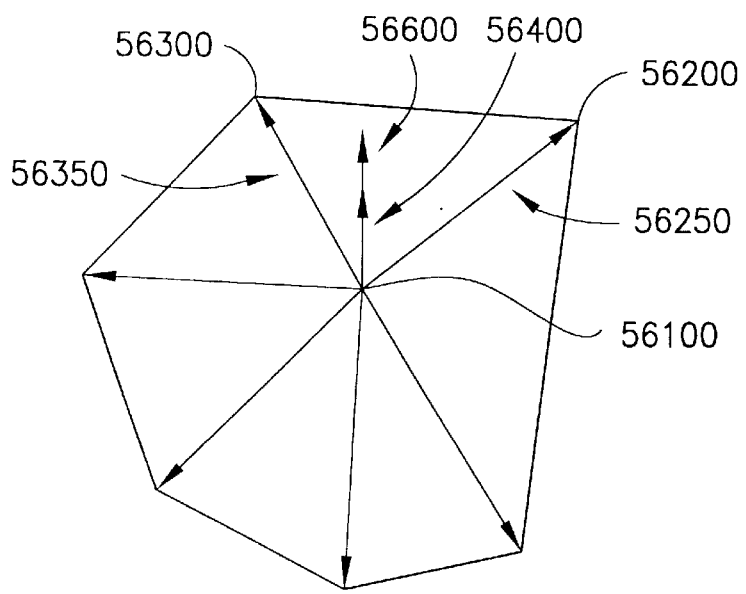
FIG. 5C is a diagram illustrating the use of a predictor function for specifying a global displacement.

It is further within the scope of the teaching of this invention that the predictor function has only one global displacement parameter having a value equal to the average of the vectors which go from the vertex to each neighboring vertex, multiplied by the global displacement parameter. This is illustrated in FIG. 5C. The predictor function value 56400 is equal to the average 56600 of the vectors 56250, 56350 which go from the neighboring vertices 56200, 56300 to the vertex 56100, multiplied by the global displacement parameter.

In the preferred embodiment the data stored in the data fields 4200, 4300 of the data structure 4000 are quantized, and may also be entropy encoded.

FIG. 6 is a flow chart of a method 6000 to apply a cut operation. The method 6000 is a preferred embodiment of the step 2400 of the method 2000 of FIG. 2. In step 6100 the method for cutting a polygonal model through a set of marked edges described in U.S. patent application Ser. No. 08/840,001, filed on Apr. 24, 1997, entitled "Method to Convert Non-Manifold Polyhedral Surfaces into Manifold Surfaces" by A. Gueziec and G. Taubin, is applied to the current manifold triangular mesh producing the new manifold triangular mesh. In step 6200 the vertices are re-enumerated according to the convention described above.

In a first aspect the invention described in the commonly assigned U.S. patent application Ser. No. 08/840,001 provides a method to remove isolated vertices by counting a number of triangles incident to each vertex to obtain a vertex valence. This is preferably accomplished by using an array of integers with one entry per vertex, which may be referred to as a vertex valence array. All the entries of the vertex valence array are first initialized to zero. Then, for each one of the three indices of each triangle, the corresponding entry in the array is incremented. After all the triangles have been considered, the isolated vertices are identified as those with zero valence. New consecutive indices are assigned to the non-isolated vertices by means of a look-up table, and the triangle indices are replaced by the corresponding look-up table entries.

Multiple triangles are removed by sorting, in increasing order, the three vertex indices within each triangle. Then the triangles are sorted in increasing lexicographic order. Finally, repeated triangles are removed from the sorted triangle array. In addition, triangles having one or more invalid vertex indices are removed.

In this commonly assigned patent application an edge is considered to be an unordered pair of vertex indices, such that both indices belong to at least one triangle. Each triangle is said to be incident to each one of its three edges. An edge is referred to as a boundary edge if it has only one incident triangle, a regular edge if it has exactly two incident triangles, and a singular edge if it has three or more incident triangles. The method counts the number of triangles incident to each edge, the edge label, by using an array of integers with one entry per edge, an edge label array. Then, for each one of the three edges of each triangle, the corresponding entry in the edge label array is incremented. During this process the indices of up to two incident triangles per edge are also stored for future use. For the case of boundary or singular edges, the corresponding indices are ignored.

Also in this commonly assigned patent application a vertex is considered to be a singular vertex if it is an end point of a singular edge, or if its triangle star (i.e., set of triangles that include the vertex index) has more than one connected component, with two triangles being connected if they share a regular edge. The two indices of triangles incident to each regular edge that were previously stored are used for determining if singular vertices are present.

Subsequently cutting through singular edges and vertices creates a new surface with more vertices and the same number of triangles. The new surface does not contain any singular vertices, but several vertex indices of the new surface correspond to each index of a singular vertex of the original surface. The regular vertices of both surfaces are in one-to-one correspondence. Some entries of some of the triangles incident to singular vertices must be modified as well. The multiplicity of a vertex of the original surface is the number of vertices of the new surface that correspond to it. To construct the new surface the multiplicities of the singular vertices are determined. To determine the multiplicities of the singular vertices each vertex star is partitioned into connected components, with two triangles being connected if they share a regular edge. The two indices of triangles incident to each regular edge that had been stored in a previous step are used for this purpose.

Vertex multiplicities are counted as follows. The multiplicity of a singular vertex is the number of different connected components of the vertex star.

In order to multiply vertices the following steps are executed. The total number of vertices of the new surface is equal to the sum of the multiplicities of the vertices of the original surface. A new vertex list and new triangle list are created according to a local or global cutting method. The new surface, described by the new vertex array and by the modified triangle array of the original surface, does not contain any singular vertices or edges.

At this point in the method cuts have been made through the polygonal surface, creating several connected polygonal surfaces that satisfy the manifold property. To orient the polygonal surfaces, the method builds a rooted spanning tree in the graph whose vertices are the mesh faces and whose edges are the non-marked regular edges. The method traverses the spanning tree starting from the root and reorients child faces consistently with their parent face. Re-orienting a face is performed by inverting the vertex cycle order for the face in the face list.

As a consequence of this operation, the polygonal surfaces are arbitrarily oriented. If desired, the method can reverse the orientation of a particular polygonal surface by reversing all of its triangles, thereby providing an oriented manifold surface.

Figure 7:
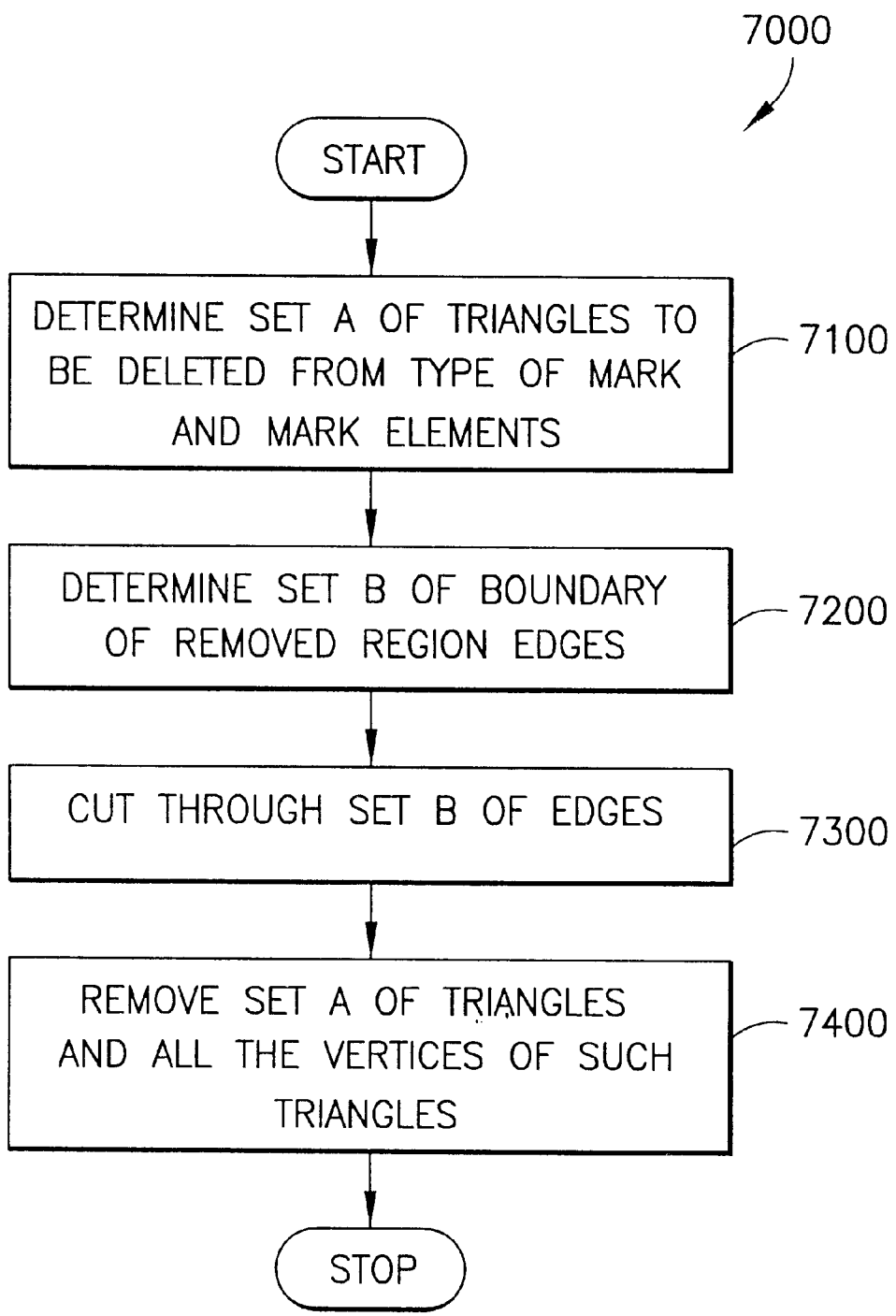
FIG. 7 is a flow chart of a method for applying a delete operation.

Referring now to FIG. 7 a flow chart is depicted of a method 7000 to apply a delete operation. Method 7000 is a preferred embodiment of the step 2400 of the method 2000 of FIG. 2. In step 7100 a set A of triangles to be deleted from the current manifold triangular mesh is determined from the values of the type of mark 3100 and marked elements 3200 (FIG. 3) as explained above. In step 7200 a set B composed of the boundary of removed region edges is determined. In step 7300 the current manifold triangular mesh is cut through the set B of edges as if these edges were marked. In step 7400 the set A of triangles and all the vertices of those triangles are removed from the current manifold triangular mesh producing the new manifold triangular mesh. In step 7400 the remaining vertices and triangles are re-enumerated according to the convention described above.

Figure 8:
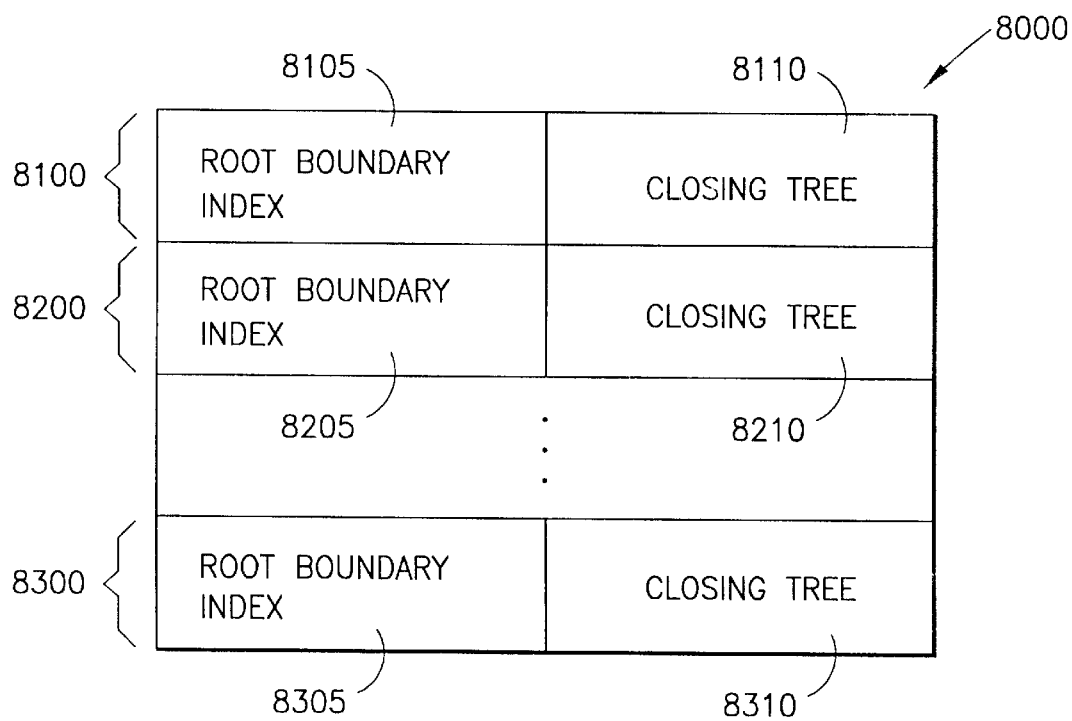
FIG. 8 is a block diagram of a data structure representing a close operation.
Figure 9:
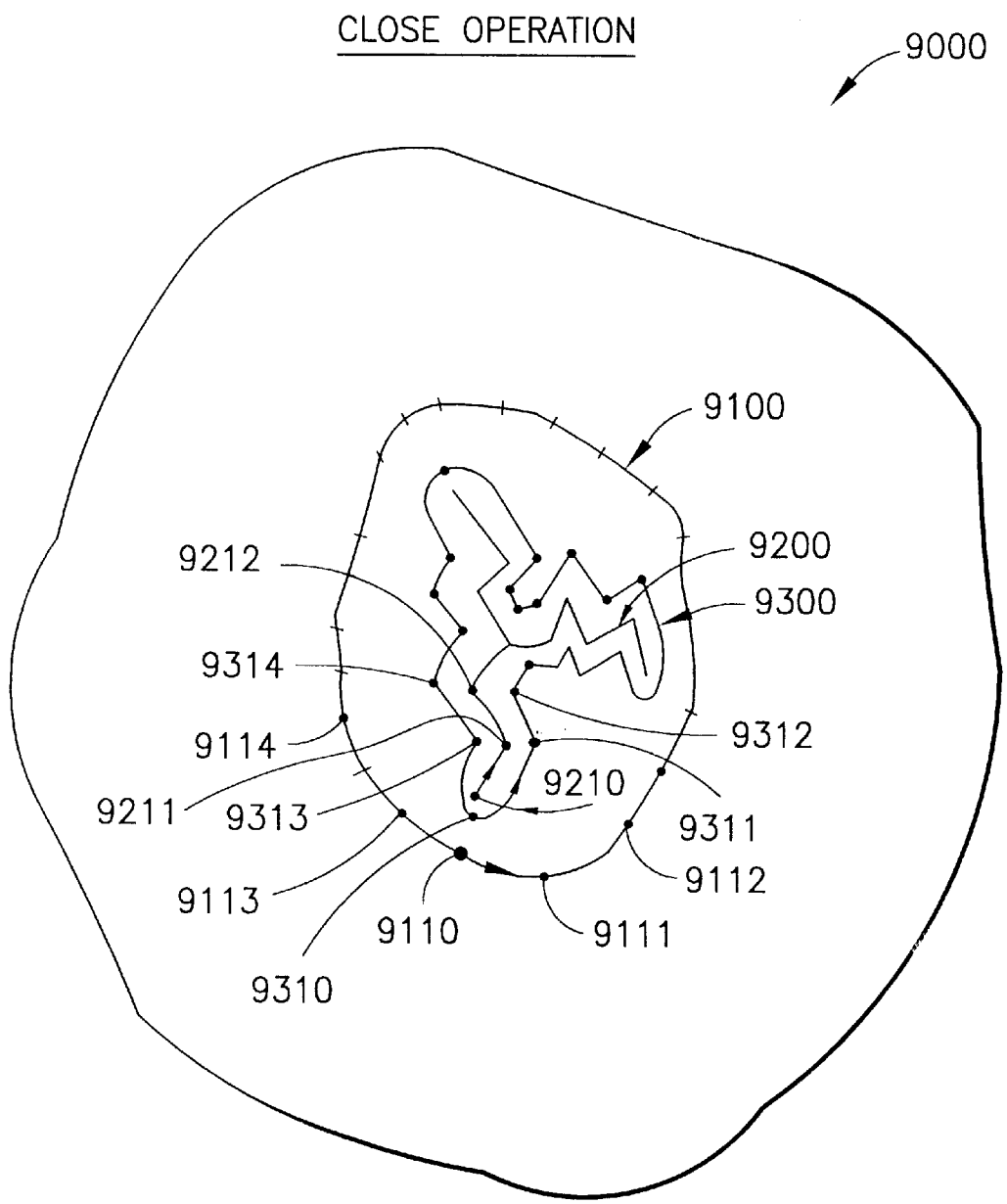
FIG. 9 is an illustration of a close operation.
Figure 10:
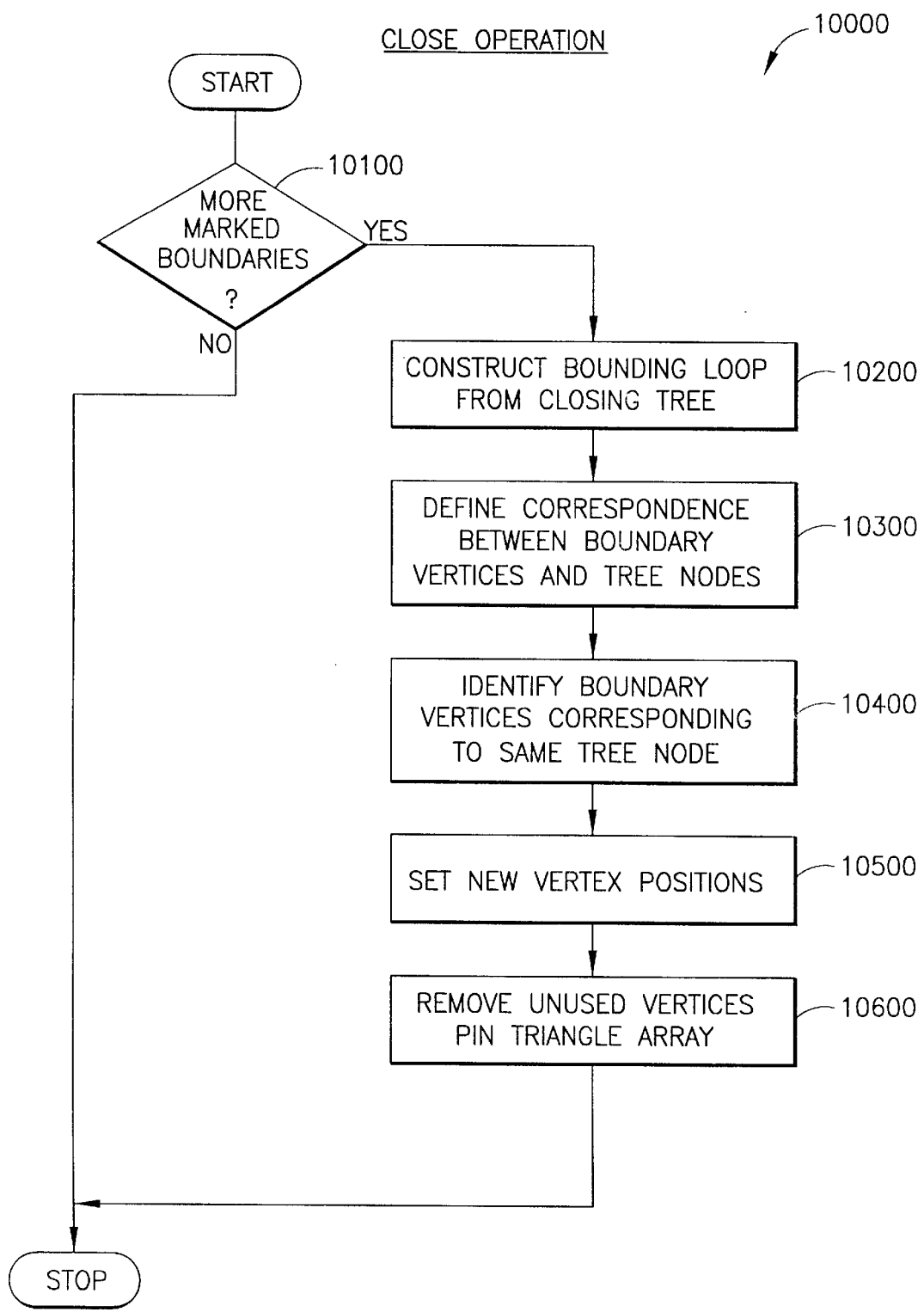
FIG. 10 is a flow chart of a method for applying a close operation.

FIG. 8 is a block diagram of a data structure 8000 representing a close operation, FIG. 9 is an illustration of a close operation, and FIG. 10 is a flow chart of a method 10000 to apply a close operation. The close operation is applied to one or more boundaries determined when the type of mark 3100 is boundary type and one or more boundaries are determined by the marked elements 3200 variable. The data structure 8000 is composed of one or more "close boundary records" 8100, 8200, 8300. Each close boundary record 8100, 8200, 8300 corresponds to one boundary 9100 of the current manifold triangular mesh 9000, and includes a "root boundary index" field 8105, 8205, 8305 and a "closing tree" field 8110, 8210, 8310. The closing tree field 8110 describes a rooted tree 9200 that defines a bounding loop 9300. The rooted tree 9200 has a root node 9210 corresponding to a "first bounding loop node" 9310. The root boundary index field 8100 determines a "first boundary vertex" 9110 associated with the first bounding loop node 9310. Consecutive boundary vertices 9114, 9113, 9110, 9111, 9112 are associated with consecutive bounding loop nodes 9314, 9313, 9310, 9311, 9312, and to corresponding rooted tree nodes 9212, 9211, 9210, 9211, 9212. The close operation partitions the boundary vertices into one or more "boundary clusters", with each boundary cluster being associated with one rooted tree node. The close operation identifies all the boundary vertices belonging to the same boundary cluster. The vertex position of the identified vertex is preferably determined by the position of the boundary vertex with lower vertex index in the boundary cluster. The other boundary vertices in each cluster are removed from the current manifold triangular mesh, and the vertex array references to deleted boundary vertices are replaced with references to the remaining boundary vertex in the cluster. In step 10100 of method 10000 (FIG. 10), it is determined whether all the marked boundaries have been considered. In step 10200 the bounding loop 9300 defined by the rooted tree 9200 is constructed. In step 10300 the correspondence between boundary vertices, and rooted tree nodes is established. In step 10400 the boundary clusters are determined and all the vertices in each boundary cluster are identified. In step 10500 the positions of the identified vertices are determined. In step 10600 the unused vertices are removed from the current manifold triangular mesh, the references to the removed vertices in the triangle array are replaced with references to the identified vertices, and vertices and triangles are re-enumerated according to the convention described above.

Figure 11:
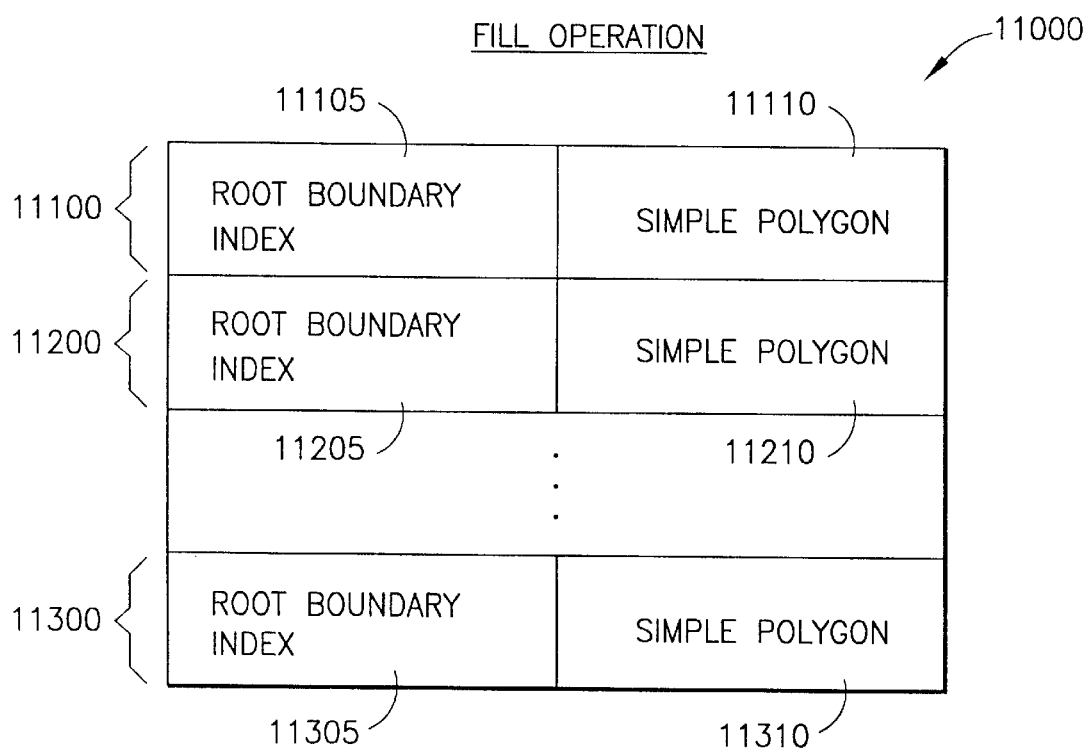
FIG. 11 is a block diagram of a data structure representing a fill operation.
Figure 12:
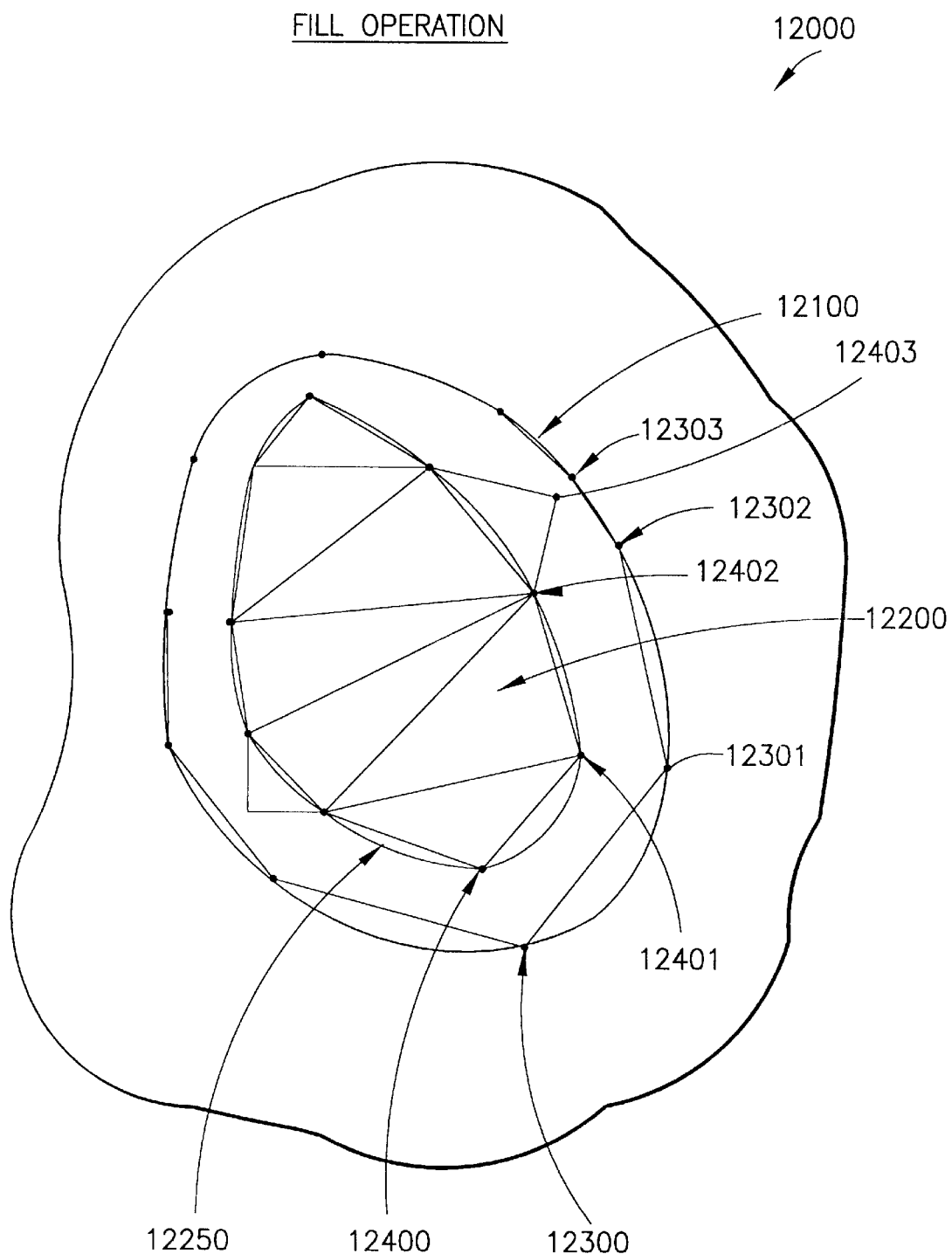
FIG. 12 is an illustration of a fill operation.
Figure 13:
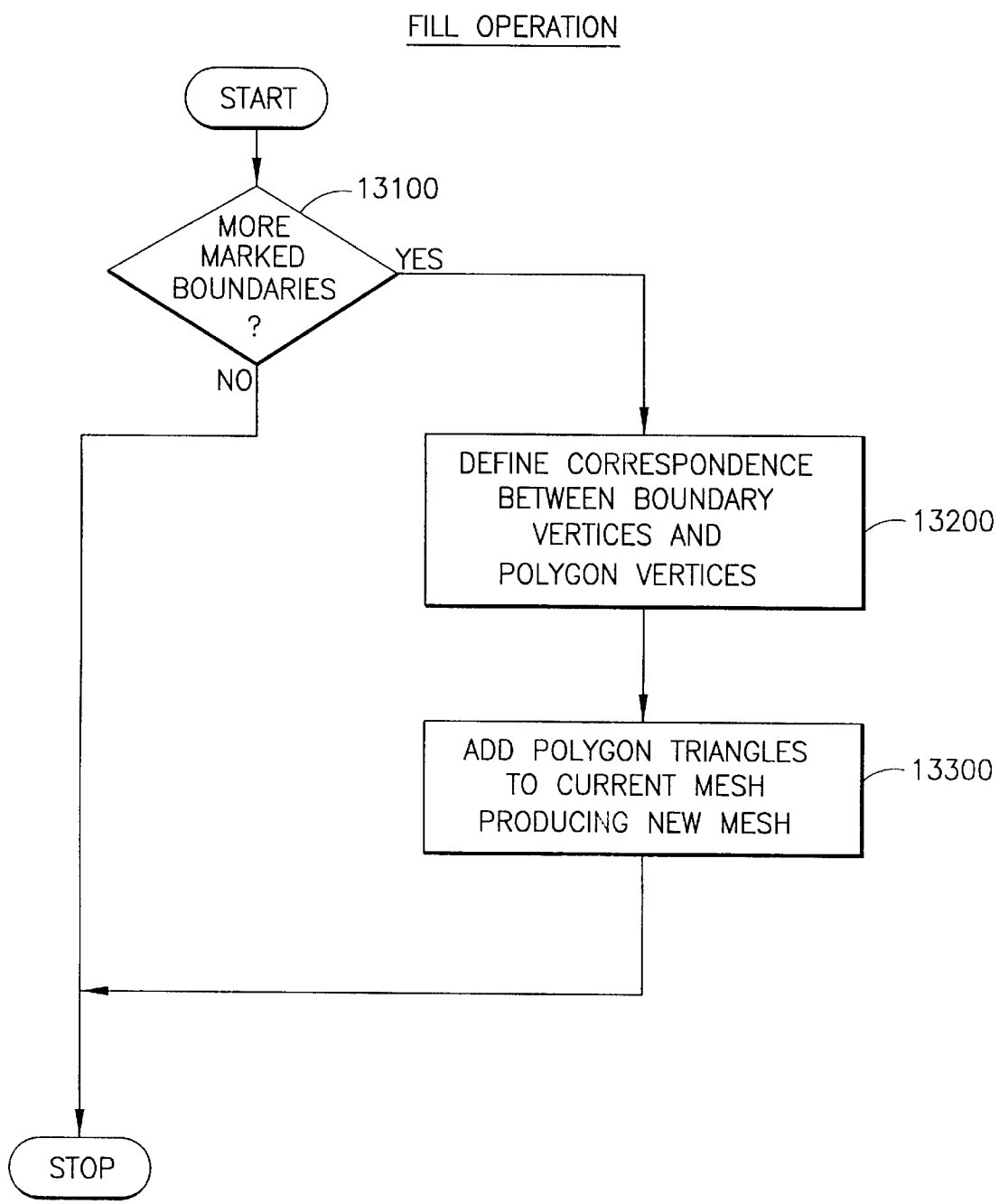
FIG. 13 is a flow chart of a method for applying a fill operation.

FIG. 11 is a block diagram of a data structure 11000 representing a fill operation, FIG. 12 is an illustration of a fill operation, while FIG. 13 is a flow chart of a method 12000 to apply a fill operation. In a manner that is similar to the previously described close operation (FIGS. 8–10), the fill operation is applied to one or more boundaries determined when the type of mark 3100 is boundary type and one or more boundaries are determined by the marked elements 3200 variable. The data structure 11000 is composed of one or more "fill boundary records" 11100, 11200 and 11300, with each fill boundary record 11100 corresponding to one boundary 12100 of the current manifold triangular mesh 12000, and is further composed of a "root boundary index" field 11105, 11205, 11305 and a "simple polygon" field 11110, 11210, 11310. The simple polygon field 11110 describes a simple polygon 12200, the boundary 12250 of the simple polygon 12200 defines a loop with a "simple polygon root vertex" 12400, and the root boundary index field 11105 determines a "first boundary vertex" 12300 associated with the simple polygon root vertex 12400. The consecutive boundary vertices 12301, 12302, 12303 are associated with consecutive vertices 12401, 12402, 12403 of the boundary 12250 of the simple polygon 12200, as in the close operation. Triangles of the simple polygon 12200 are appended to the current mesh, and the indices of vertices 12401, 12402, 12403 of the triangles of the simple polygon 12200 are replaced with the indices of the consecutive vertices 12301, 12302, 12303.

In step 13100 of the method 13000 it is determined whether all of the marked boundaries have been considered. In step 13200 correspondences between boundary vertices 12300, 12301, 12302, 12303 and vertices 12400, 12401, 12402, 12403 of the simple polygon 12200 are determined. In step 13300, the triangles of the simple polygon 12200 are appended to the current mesh producing a new mesh.

Figure 14:
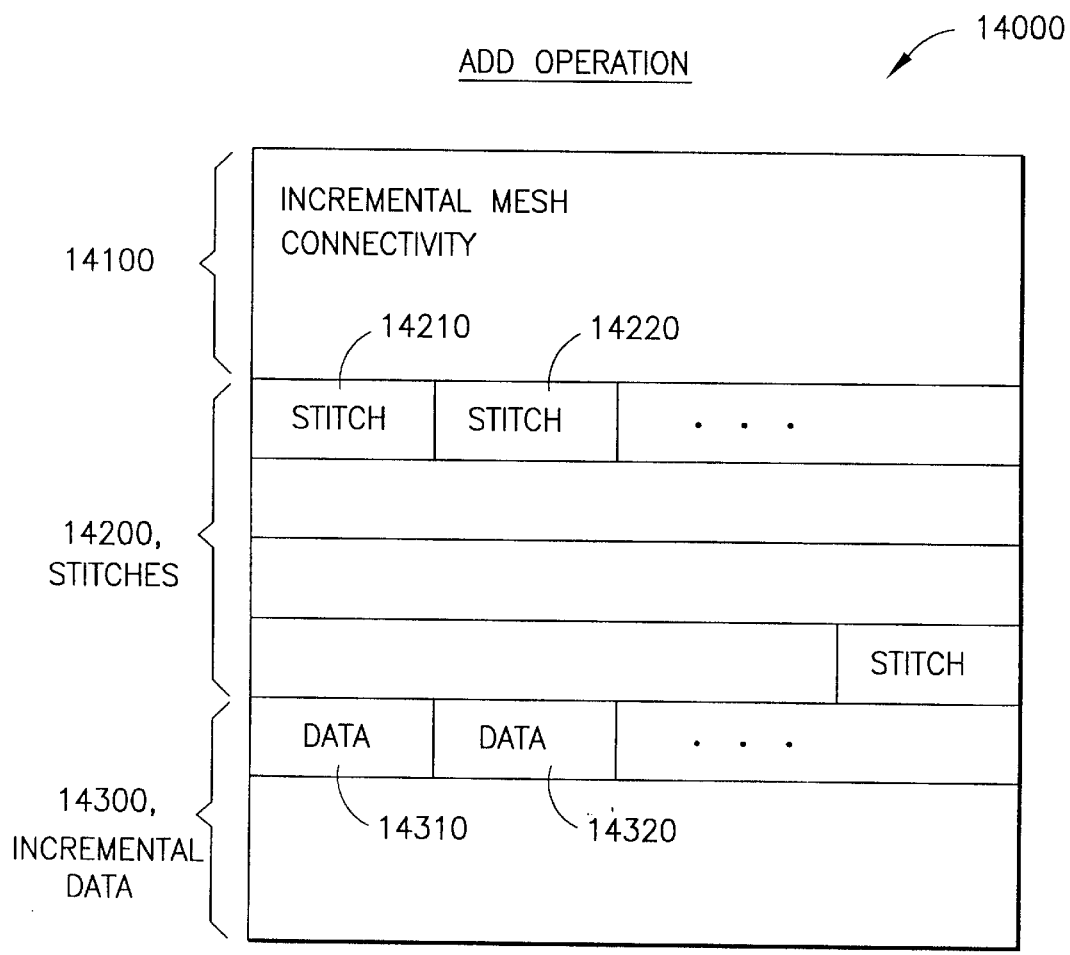
FIG. 14 is a block diagram of a data structure representing an add operation.
Figure 16:
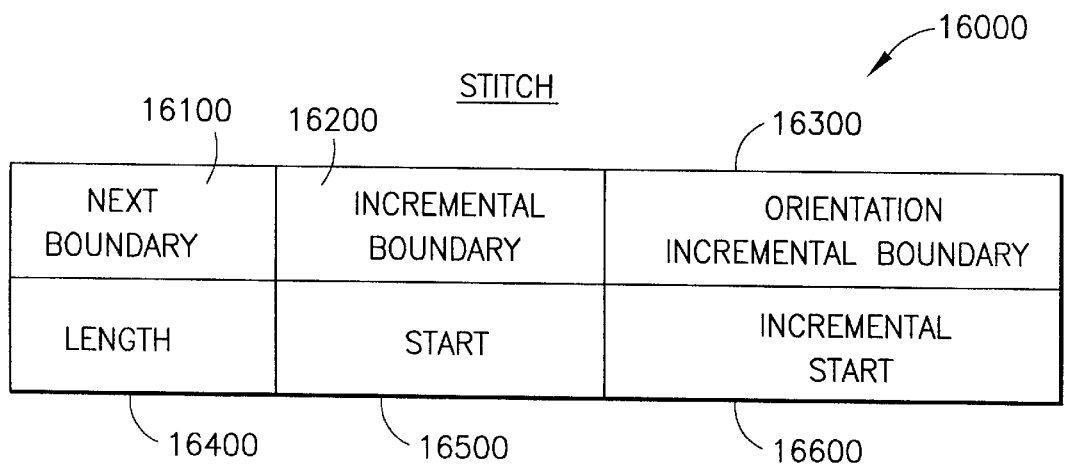
FIG. 16 is a block diagram of a data structure representing a stitch.
Figure 15:
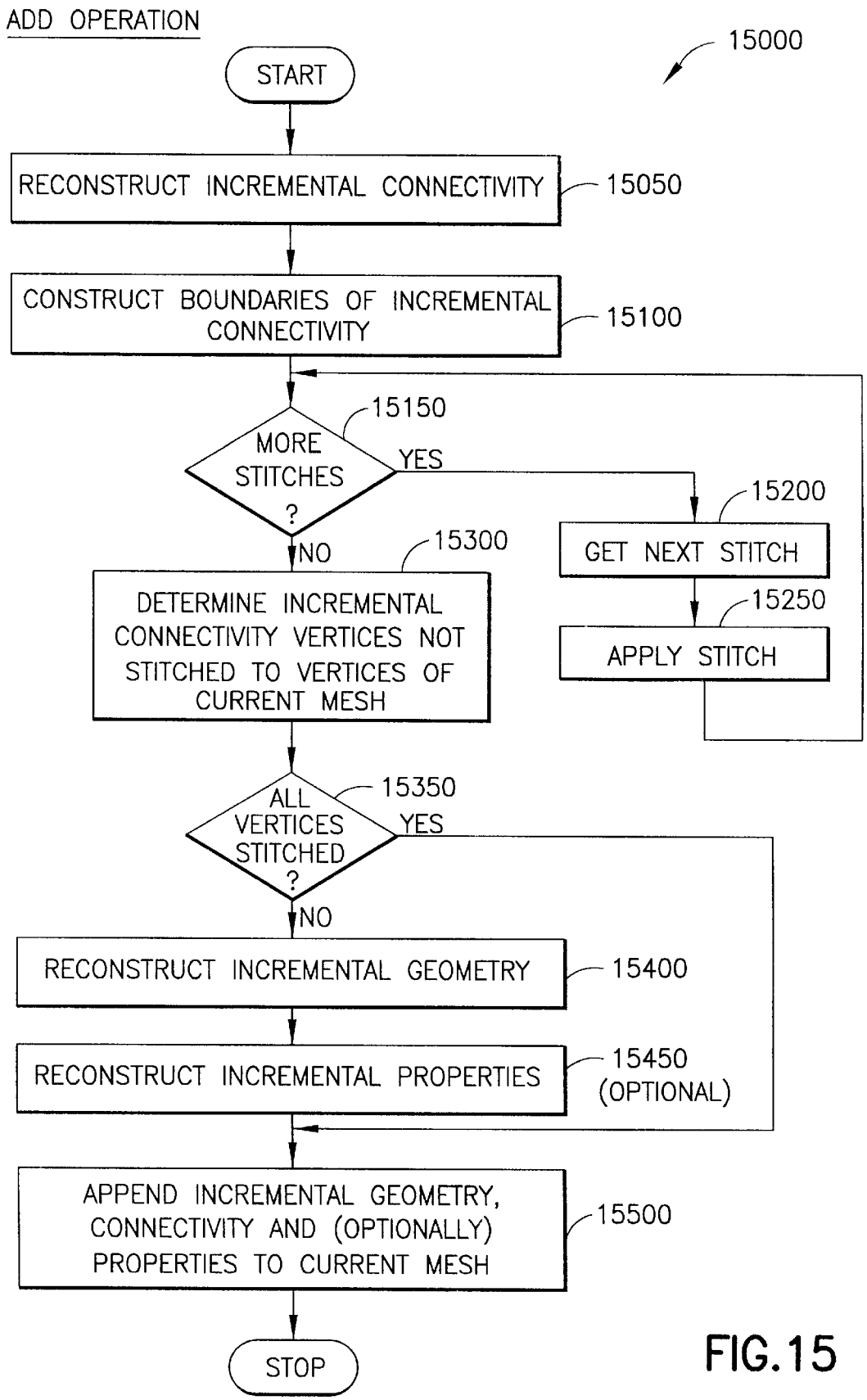
FIG. 15 is a flow chart of a method for applying a fill operation.

FIG. 14 is a block diagram of a data structure 14000 representing an add operation. The data structure 14000 is composed of an "incremental mesh connectivity" record 14100, a "stitch" record 14200, and an "incremental data" record 14300. FIG. 15 is a flow chart of a method 15000 to apply an add operation. FIG. 16 is a block diagram of a data structure 16000 representing a stitch in fields 14210, 14220 of the stitch record 14200 of data structure 14000.

In step 15050 of the method 15000 of FIG. 15 the incremental connectivity is reconstructed from a potentially compressed representation. In step 15100 the boundaries of the set of triangles defining the incremental connectivity are determined using any suitable conventional methods. In step 15150 it is determined whether all stitches have been considered. If this is not the case, the method proceeds to step 15200, where the next stitch is retrieved, and further to step 15250 where the next retrieved stitch is applied. In step 15300 those vertices referenced in the incremental connectivity, and not stitched to vertices of the current mesh, are determined. In step 15350 it is determined whether all vertices referenced in the incremental connectivity have been stitched to vertices of the current mesh. If this is the case, the method proceeds to step 15500, otherwise the method proceeds to step 15400. In step 15400, the incremental geometry is reconstructed from a potentially compressed representation. In an optional step 15450 the properties of the corresponding incremental mesh are reconstructed from a potentially compressed representation. In step 15500 the incremental geometric connectivity and (optionally) properties are appended to the current mesh, resulting in a new mesh. The boundaries of the current mesh to be stitched are identified using boundary marks. The enumeration of boundaries of the current mesh induces an enumeration of the marked boundaries of the current mesh.

The data structure 16000 (FIG. 16) for representing a stitch record is composed of the following fields. A "next boundary" record 16100, which is preferably encoded using a single bit of information, indicates whether the stitch applies to the same marked boundary that was considered in the previous stitch record, or to the next marked boundary in the enumeration. An "incremental boundary" field 16200 identifies a corresponding boundary of the incremental connectivity. An "orientation of the incremental boundary" field 16300 is also preferably encoded using a single bit of information. In this case a value of 0 indicates that the stitch must be performed according to the orientation of the boundary of the current mesh, which is determined using the convention described above, and to the orientation of the boundary of the incremental connectivity which is determined using the convention described above. A value of 1 indicates that the orientation of the boundary of the incremental connectivity must be reversed. A "length" field 16400 indicates the number of edges of each boundary that must be stitched where, preferably, a length value of zero indicates that the length of the stitch is the full length of the boundary of the current mesh. A "start" field 16500 indicates the start of the stitch in the boundary of the current mesh with respect to the origin of the boundary of the current mesh, which is determined according to the above convention. If the value of the length field 16400 is zero the start field 16500 is implicitly determined as the origin, and hence the start field 16500 is preferably omitted. An "incremental start" field 16600 indicates the start of the stitch in the boundary of the incremental connectivity with respect to the origin of the boundary of the incremental connectivity, which is determined according to the above described convention.

Figure 17:
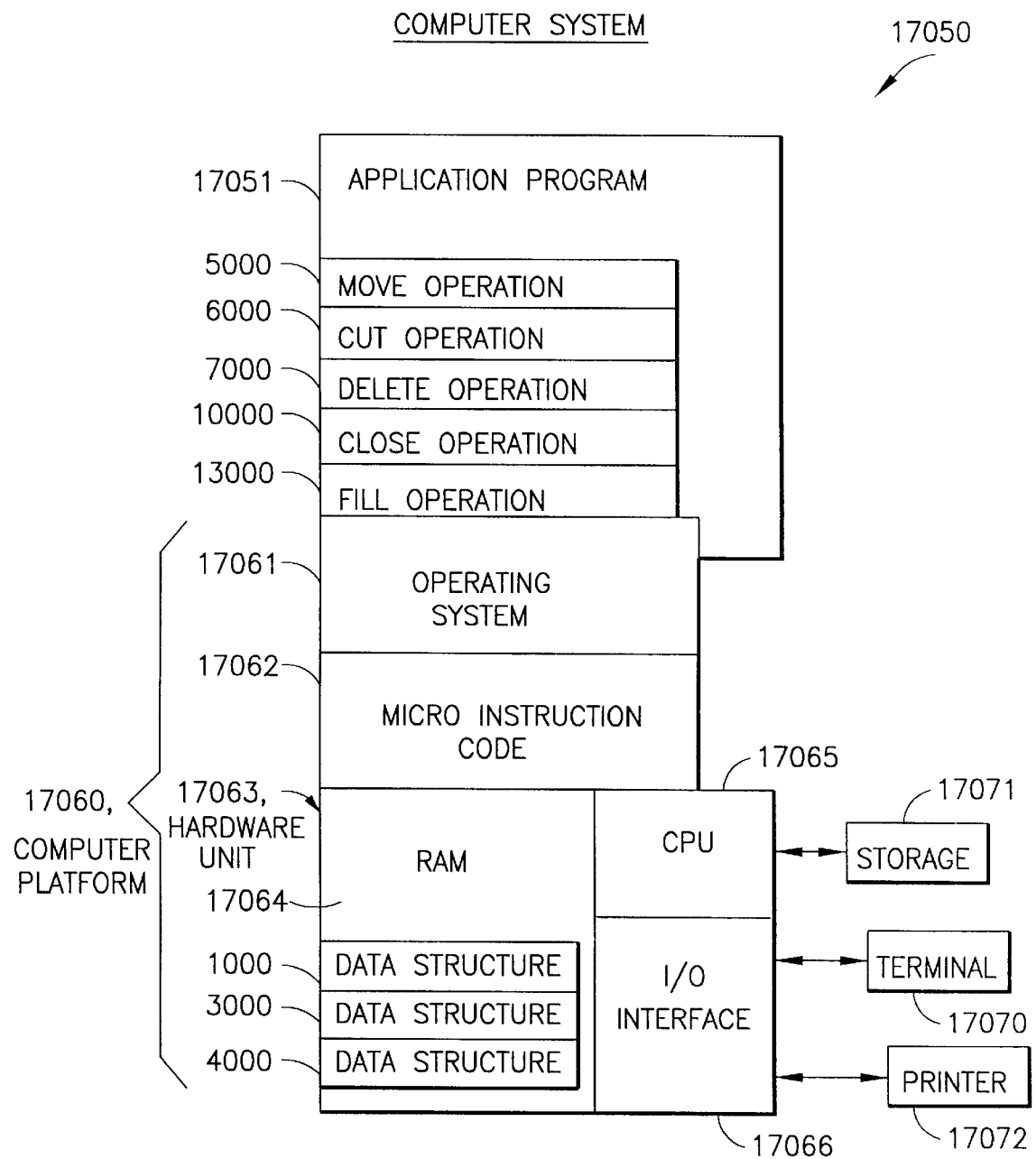
FIG. 17 is a functional block diagram of a computer system that is suitable for embodying the present invention.

FIG. 17 is a block diagram showing an exemplary computer system 17050 on which a preferred embodiment of the present invention operates. The preferred embodiment includes one or more application programs 17051 that operate on a computer platform 17060 which includes a hardware unit 17063. Some application programs 17051 that run on the computer system 17050 include, according to the present invention, computer programs implementing the move operation 5000, the cut operation 6000, the delete operation 7000, the close operation 10000, and a computer program implementing the fill operation 13000.

The hardware unit 17063 includes one or more central processing units (CPU) 17065, a random access memory (RAM) 17064, and an input/output interface 17066. Microinstruction code 17062, which may be a reduced instruction set, can also be included on the platform 17060. Various peripheral components may be connected to the computer platform 17060, including a graphical interface or terminal and user interface 17070, a data storage device 17071, and a printing device 17072. An operating system 17061 coordinates the operation of the various components of the computer system 17050. An example of the computer system 17050 is the IBM RISC System/6000 (RISC System/6000 is a trademark of the International Business Machines Corporation.)

It is readily understood that those skilled in the computer arts will be familiar with many equivalent computer systems 17050, and the teachings of this invention are not intended to be limited for use with any one particular type of computer or computer architecture.

The RAM memory 17064 is shown containing a plurality of data structures, such as the data structures 1000, 3000 and 4000, which are employed during the operation of the methods of this invention. It should be realized that these data structures could as well be maintained in the data storage unit 17071, or on both the RAM 17064 and data storage unit 17071.

It can be appreciated that the inventors have disclosed a method for encoding a representation of a three dimensional scene. The method includes steps of (a) generating surface data representing polygonal surfaces, the polygonal surfaces including a plurality of elements; (b) generating first data representing a first operation with respect to elements of the polygonal surfaces; and (c) generating second data representing a second operation with respect to elements of the polygonal surfaces. The second operation is different from said first operation, and the first and second operations are performed in a predetermined sequence with respect to elements of the polygonal surfaces to generate a representation of a three dimensional scene. The first and second operations are one of the above described mark operation, move operation, cut operation, delete operation, close operation, and fill operation.

The method further includes a step of grouping the surface data, the first data and the second data to form at least one message. The at least one message may then be communicated to a target node, such as over a data communications network, whereby the first and second operations are performed in a predetermined sequence with respect to elements of the polygonal surfaces to generate a representation of a three dimensional scene.

Although the invention has been shown and described with respect to the particular embodiments thereof, it should be understood by those skilled in the art that the foregoing and various other changes, omissions, and additions in the form and detail thereof may be made without departing from the spirit and scope of the invention.

What is claimed is:

1. A method for encoding a representation of a three dimensional scene, comprising the steps of:

generating surface data representing polygonal surfaces, the polygonal surfaces comprising a plurality of elements;

generating first data representing a first operation with respect to elements of said polygonal surfaces;

generating second data representing a second operation with respect to elements of the polygonal surfaces, wherein the second operation is different from the first operation, and wherein the first and second operations are performed in a predetermined sequence with respect to elements of the polygonal surfaces to generate a representation of a three dimensional scene; and performing the first and second operations in a predetermined sequence on the surface data with respect to elements of said polygonal surfaces to generate a representation of a three dimensional scene.

2. A method as in claim 1, wherein the step of performing includes preliminary steps of:
grouping the surface data, the first data, and the second data to form at least one message; and
communicating the at least one message to a target node where the first and second operations are performed in the predetermined sequence with respect to elements of the polygonal surfaces to generate the representation of the three dimensional scene.

3. A method as in claim 1, wherein the first and second operations are one of a mark operation, a move operation, a cut operation, a delete operation, a close operation, and a fill operation.

4. A method as in claim 3, wherein the mark operation operates in accordance with a mark data structure comprised of a type of mark field and a marked elements field, wherein the type of mark field designates one of a none type, a vertex type, a triangle type, an edge type, a connected component type, or a boundary type.

5. A method as in claim 4, wherein the marked elements field is comprised of one or more mark bits, each mark bit corresponding to one element of a manifold triangular mesh, and a value of each mark bit specifying whether a corresponding element is marked or is not marked.

6. A method as in claim 5, wherein bits of the marked elements field are compressed.

7. A method as in claim 5, wherein bits of the marked elements field are compressed by one run-length encoding or entropy encoding.

8. A method as in claim 4, wherein the move operation operates in accordance with a move data structure comprised of a parameters field and one or more data fields each of which is associated with one marked vertex of a current manifold triangular mesh.

9. A method as in claim 8, wherein data in the data fields is quantized.

10. A method as in claim 8, wherein data in the data fields is quantized and entropy encoded.

11. A method as in claim 8, wherein the move operation is performed in accordance with a method comprised of the steps of:
determining a set of displaced vertices from values of the type of mark field and the set of marked elements field, wherein for the case where the type of marked elements field indicates a vertex type, the set of displaced vertices is comprised of the vertices determined by the set of marked elements, else the set of displaced vertices is comprised of all the vertices belonging to the marked elements;
determining vertex displacements corresponding to the vertices in the set of displaced vertices from data contained in the move data structure; and
applying the determined vertex displacements to the current manifold triangular mesh to produce a new manifold triangular mesh.

12. A method as in claim 11, wherein each vertex displacement is decomposed as a sum of a global vertex displacement and a relative vertex displacement, wherein the global vertex displacement is encoded in the parameters field of the move data structure, and wherein the relative vertex displacement is encoded in the data fields of the move data structure.

13. A method as in claim 12, wherein the global vertex displacement has a same value for all displaced vertices.

14. A method as in claim 12, wherein the global vertex displacement has potentially different values for different displaced vertices, and is represented as a predictor function of one or more global displacement parameters that are encoded in the parameters field of the move data structure.

15. A method as in claim 14, wherein the predictor function is further a function of one or more neighboring vertices of the vertex.

16. A method as in claim 14, wherein the predictor function is represented by one global displacement parameter having a value equal to an average of vectors which go from the vertex to each neighboring vertex, multiplied by the global displacement parameter.

17. A method as in claim 4, wherein the delete operation is performed in accordance with a method comprised of the steps of:
determining, from values of the type of mark field and the marked elements field, a set A comprised of triangles to be deleted from a current manifold triangular mesh;
determining a set B comprised of a boundary of removed region edges;
cutting the current manifold triangular mesh through the set B of edges;
removing from the current manifold triangular mesh the set A of triangles and all vertices of the removed triangles to produce a new manifold triangular mesh; and
re-enumerating the remaining vertices and triangles of the new manifold triangular mesh.

18. A method as in claim 4, wherein the close operation operates in accordance with a close data structure comprised of one or more close boundary records each corresponding to one marked boundary of a current manifold triangular mesh, each of said close boundary records comprising a root boundary index field and a closing tree field that describes a rooted tree that defines a bounding loop, the rooted tree having a root node corresponding to a first bounding loop node.

19. A method as in claim 18, wherein the close operation is performed in accordance with a method comprised of the steps of:
constructing a bounding loop defined by the rooted tree;
establishing a correspondence between boundary vertices and rooted tree nodes;
determining boundary clusters and identifying all vertices in each boundary cluster, wherein each boundary cluster is associated with one rooted tree node;
determining positions of the identified vertices;
removing unused vertices from the current manifold triangular mesh;
replacing references to the removed vertices with references to the identified vertices; and
re-enumerating the vertices and triangles.

20. A method as in claim 4, wherein the fill operation operates in accordance with a fill data structure comprised of one or more fill boundary records each of which corresponds to one marked boundary of a current manifold triangular mesh, wherein each of the fill boundary records is comprised of a root boundary index field and a simple polygon field that describes a simple polygon having a boundary that defines a loop with a simple polygon root vertex, and wherein the associated root boundary index field specifies a first boundary vertex associated with the simple polygon root vertex.

21. A method as in claim 20, wherein the fill operation is performed in accordance with a method comprised of the steps of:
determining correspondences between boundary vertices and vertices of the simple polygon are determined; and
appending triangles of the simple polygon to the current manifold triangular mesh to produce a new manifold triangular mesh.

22. A method as in claim 4, wherein the add operation operates in accordance with an add data structure comprised of an incremental mesh connectivity record, at least one stitch record, and at least one incremental data record.

23. A method as in claim 22, wherein each stitch record is comprised of a stitch data structure comprised of next boundary record, an incremental boundary field that identifies a corresponding boundary of incremental connectivity, an orientation of the incremental boundary field, a length field that indicates a number of edges of each boundary that must be stitched, an optional start field that indicates the start of the stitch in the boundary of the current manifold triangular mesh, and an incremental start field that indicates the start of the stitch in the boundary of the incremental connectivity.

24. A method as in claim 23, wherein the add operation is performed in accordance with a method comprised of the steps of:

determining boundaries of a set of triangles defining an incremental connectivity;

applying all required stitches having corresponding stitch data structures, wherein those boundaries of the current manifold triangular mesh to be stitched are identified using boundary marks;

determining those vertices that are referenced in the incremental connectivity but not stitched to vertices of the current manifold triangular mesh;

determining whether all vertices referenced in the incremental connectivity have been stitched to vertices of the current manifold triangular mesh; if yes, appending an incremental geometric connectivity and optional properties to the current manifold triangular mesh to produce a new manifold triangular mesh;

else first reconstructing the incremental geometry and optionally reconstructing the properties of the corresponding incremental manifold triangular mesh.

25. A method as in claim 1, wherein the surface data forms a part of a data structure comprised of a specification of a base triangular mesh and said first and second operations.

26. A computer implemented method for operating on a manifold triangular mesh having a representation comprised of a base manifold triangular mesh, comprising steps of:

marking elements of a current manifold triangular mesh using a data structure that specifies a type of mark and a set of marked elements of the current manifold triangular mesh, the type of mark including a vertex type, a triangle type, an edge type, a connected component type, a boundary type, and a none type;

operating on the marked elements of the current manifold triangular mesh using individual ones of a plurality of sequentially applied mesh surgery operations comprised of mark, move, cut, delete, close, fill, and add mesh surgery operations; and obtaining a new manifold triangular mesh.

27. A method as in claim 26, wherein the move operation determines a set of displaced vertices from a set of marked vertices, and applies a set of vertex displacements to the set of displaced vertices.

28. A method as in claim 26, wherein the cut operation cuts the current manifold triangular mesh through a set of marked edges.

29. A method as in claim 26, wherein the close operation is applied to marked boundaries.

30. A method as in claim 26, wherein the fill operation adds triangles of a simple polygon to the current manifold triangular mesh by establishing a one to one correspondence between a contiguous subset of boundary edges of the manifold triangular mesh and the same number of contiguous edges of a loop defined by a boundary of the simple polygon.

31. A method as in claim 26, wherein the add operation is specified by an incremental manifold triangular mesh and a sequence of stitches, where the incremental manifold triangular mesh is a manifold triangular mesh, and where a stitch is a one to one correspondence between a contiguous subset of boundary edges of one boundary of the manifold triangular mesh and the same number of contiguous edges of boundary edges of one boundary of the incremental manifold triangular mesh.

32. A data structure for encoding a representation of a three dimensional scene comprising surface data representing polygonal surfaces, comprising:

a base triangular mesh record;

a first operation record for specifying a first operation to be performed on said base triangular mesh record; and at least one additional operation record for specifying a different operation to be performed after a completion of said first operation for generating a resulting manifold triangular mesh.

33. A data structure as in claim 32, wherein said base triangular mesh record is comprised of a vertex positions array, a triangle array, and one or more optional property arrays.

34. A data structure as in claim 32, wherein said base triangular mesh record is a compressed record comprised of a vertex positions array, a triangle array, and one or more optional property arrays.

35. A data structure as in claim 32, wherein said operation records specify one of a mark operation, a move operation, a cut operation, a delete operation, a close operation, and a fill operation.

36. A data structure as in claim 32, wherein one of said operation records specifies a mark operation that operates in accordance with a mark data structure comprised of a type of mark field and a marked elements field, wherein the type of mark field designates one of a none type, a vertex type, a triangle type, an edge type, a connected component type, or a boundary type.

37. A data structure as in claim 36, wherein the marked elements field is comprised of one or more mark bits, each mark bit corresponding to one element of a manifold triangular mesh, and a value of each mark bit specifying whether a corresponding element is marked or is not marked.

38. A data structure as in claim 37, wherein bits of the marked elements field are compressed.

39. A data structure as in claim 32, wherein one of said operation records specifies a move operation that operates in accordance with a move data structure comprised of a parameters field and one or more data fields each of which is associated with one marked vertex of a current manifold triangular mesh.

40. A data structure as in claim 39, wherein data in the data fields is at least one of quantized and entropy encoded.

41. A data structure as in claim 32, wherein one of said operation records specifies a fill operation that operates in accordance with a fill data structure comprised of one or more fill boundary records each of which corresponds to one marked boundary of a current manifold triangular mesh, wherein each of the fill boundary records is comprised of a root boundary index field and a simple polygon field that describes a simple polygon having a boundary that defines a loop with a simple polygon root vertex, and wherein the associated root boundary index field specifies a first boundary vertex associated with the simple polygon root vertex.

* * * * *